Figures 4, 16, 17:
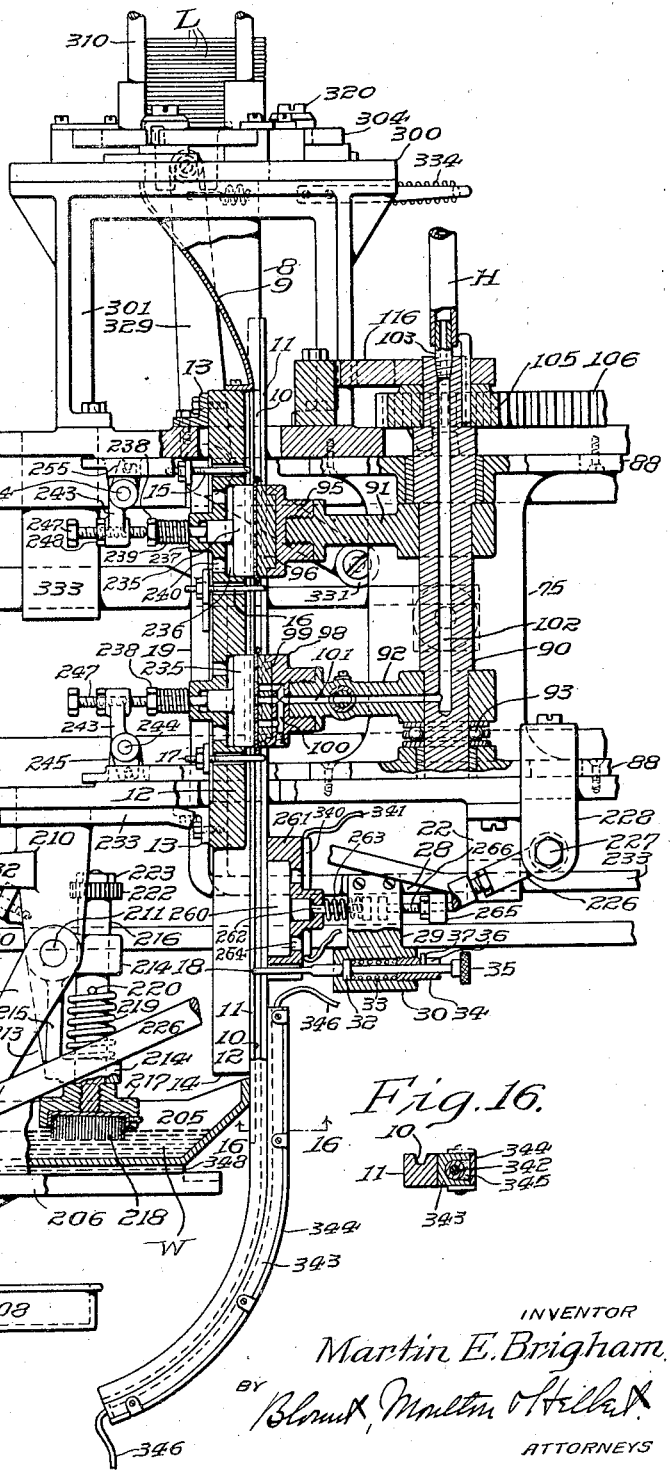

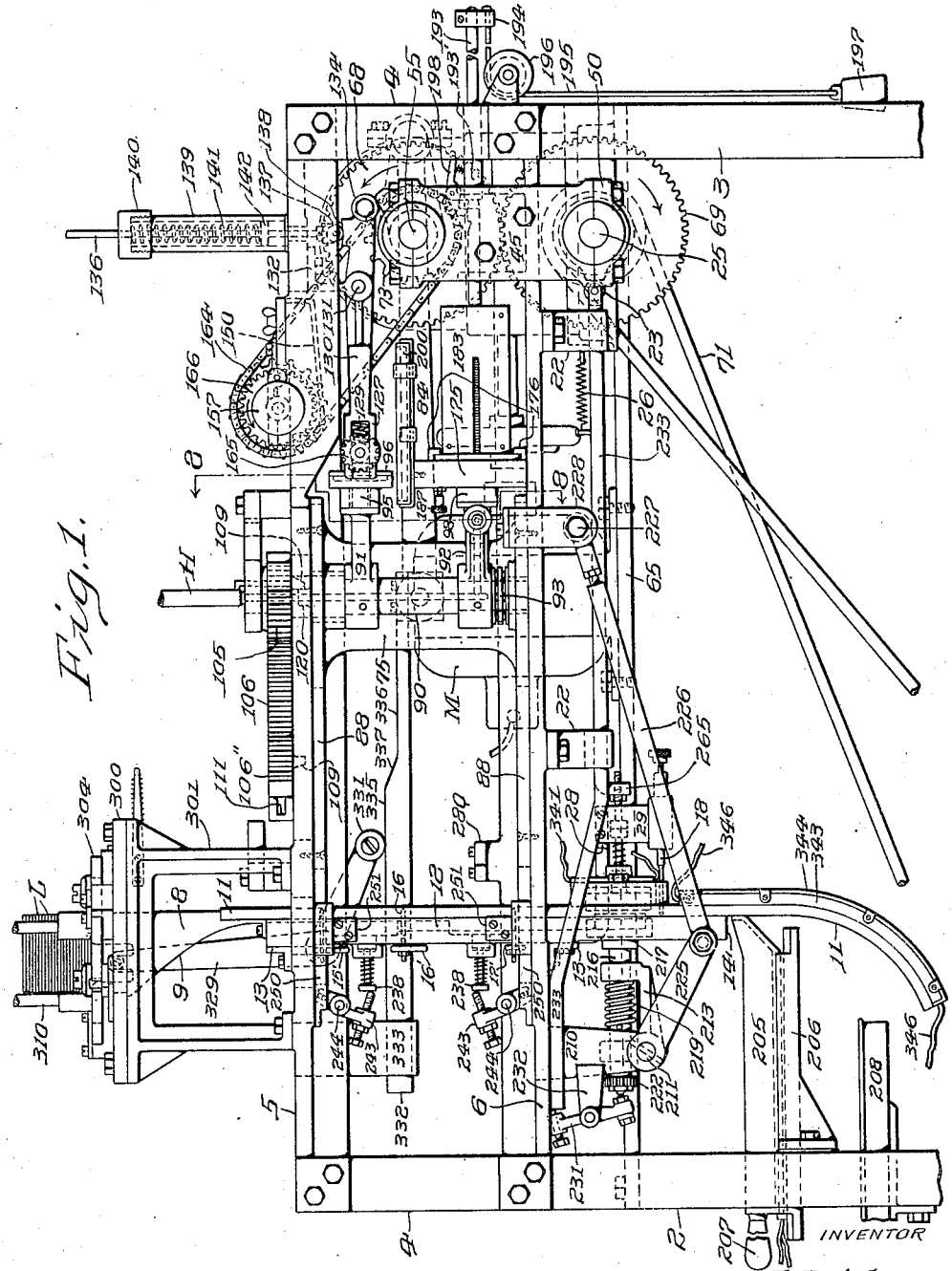

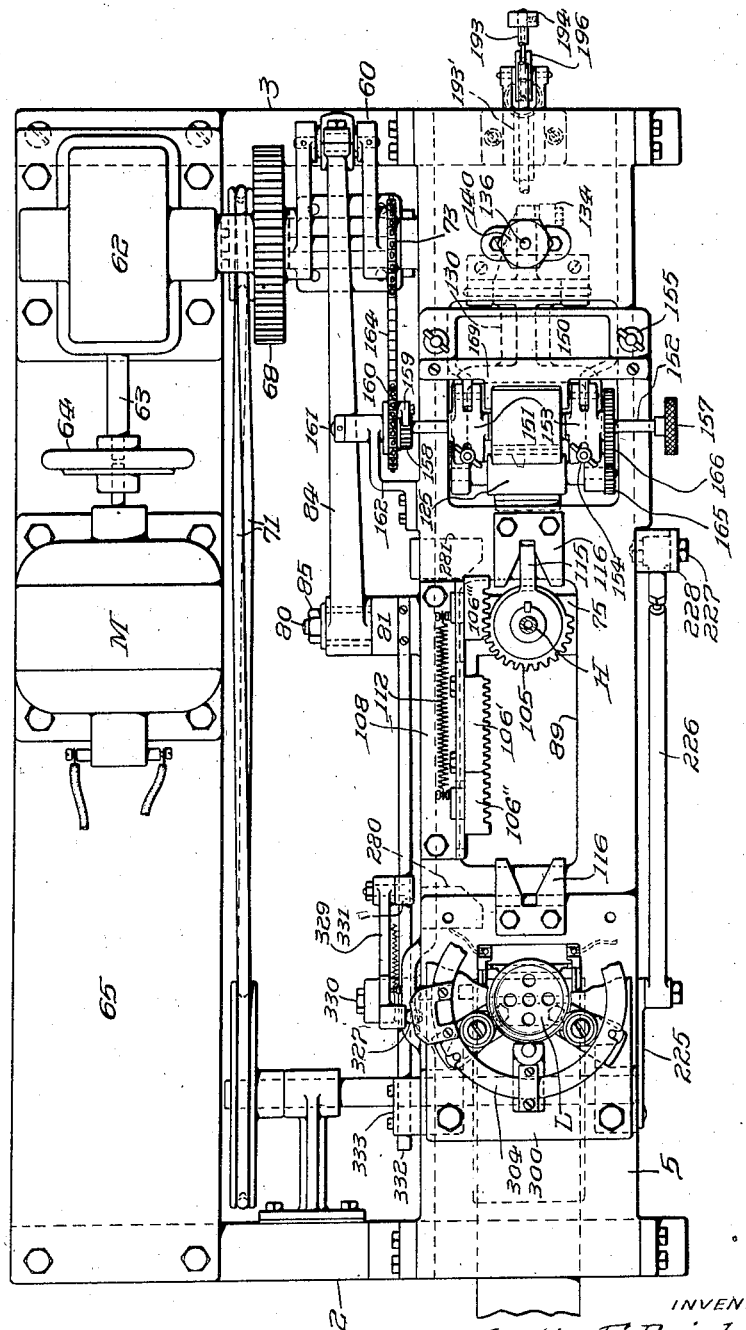

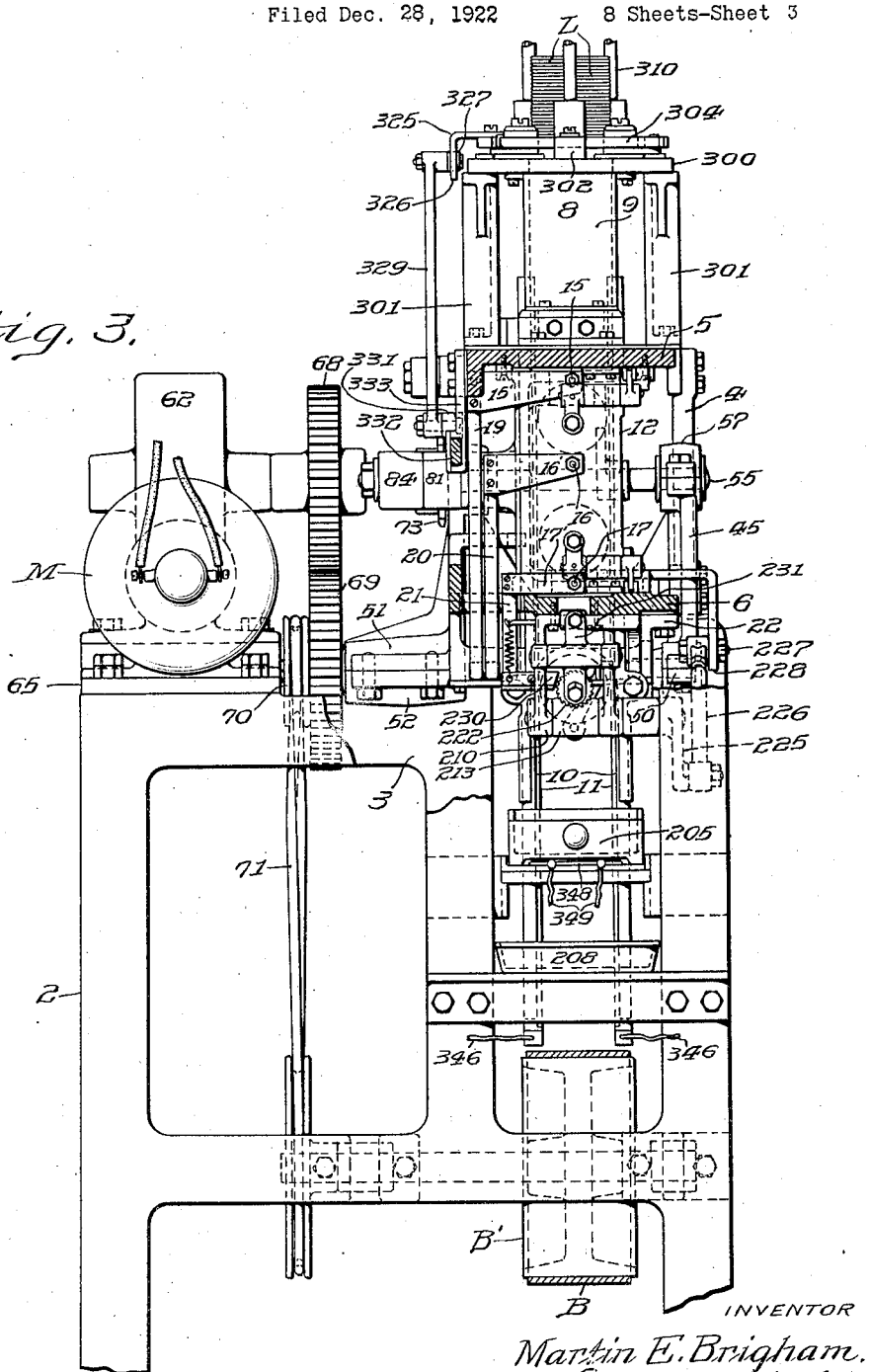

Dec. 30, 1924.

M. E. BRIGHAM

LABELING AND WAXING MACHINE

Filed Dec. 28, 1922   8 Sheets-Sheet 4

1,520,747

INVENTOR
Martin E. Brigham
BY
ATTORNEYS

WITNESS

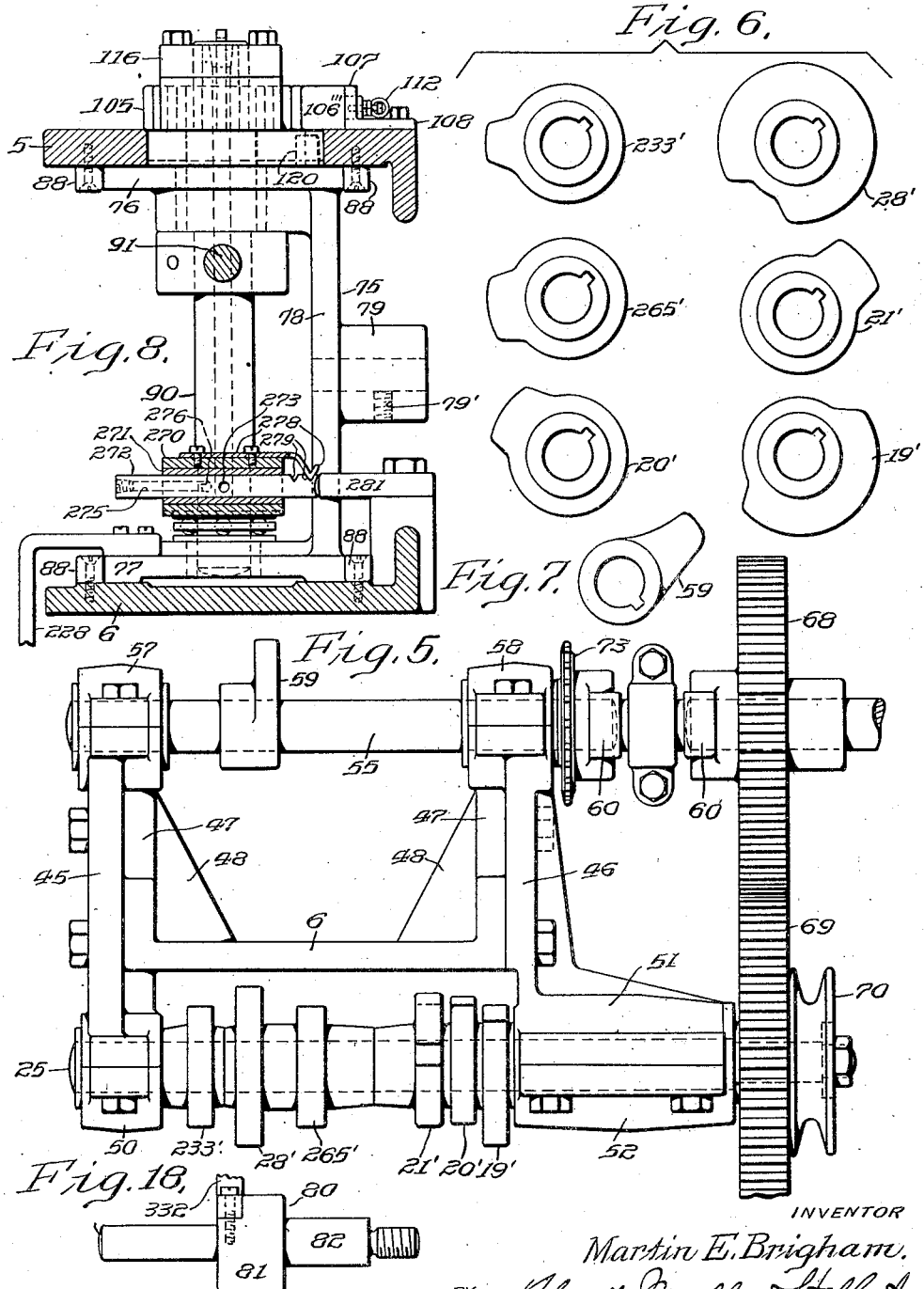

Dec. 30, 1924.

M. E. BRIGHAM 1,520,747

LABELING AND WAXING MACHINE

Filed Dec. 28, 1922    8 Sheets-Sheet 6

WITNESS
F. J. Hartman

INVENTOR
Martin E. Brigham,
BY
ATTORNEYS

Dec. 30, 1924.

M. E. BRIGHAM

LABELING AND WAXING MACHINE

Filed Dec. 28, 1922

1,520,747

8 Sheets-Sheet 7

INVENTOR
Martin E. Brigham.

WITNESS
F. J. Hartman

BY
Blount, Moulton & Heller

ATTORNEYS

Dec. 30, 1924.
M. E. BRIGHAM
1,520,747
LABELING AND WAXING MACHINE
Filed Dec. 28, 1922   8 Sheets-Sheet 8
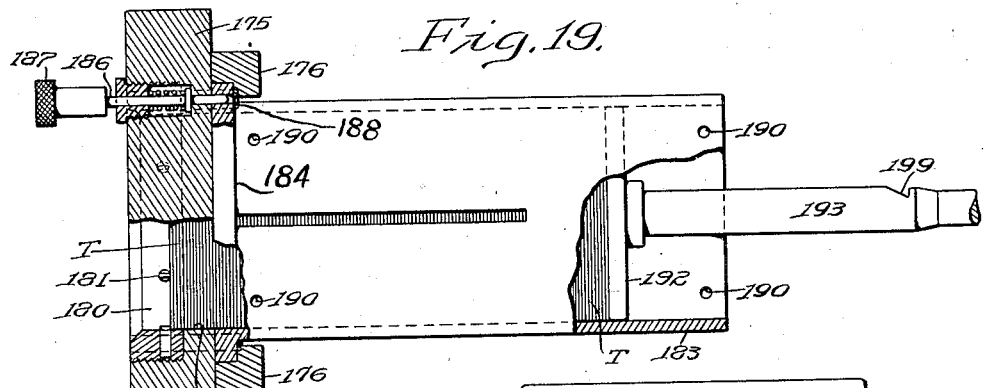
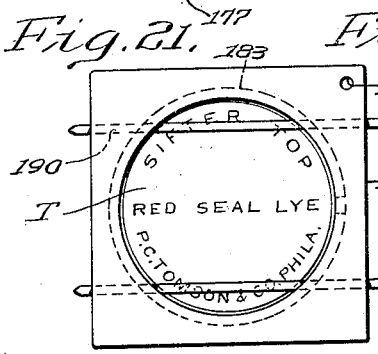
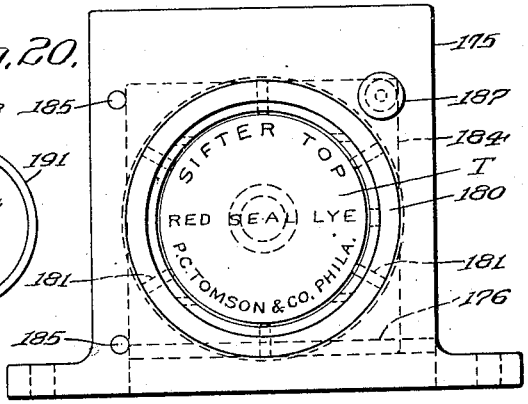
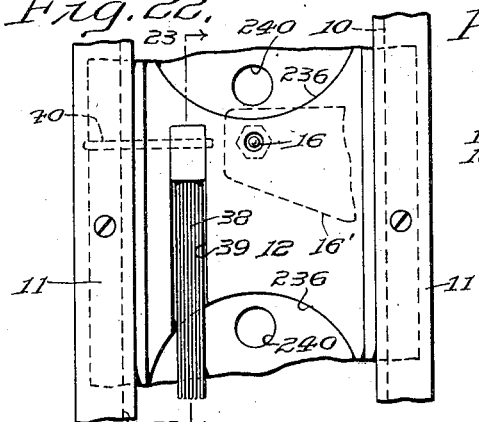
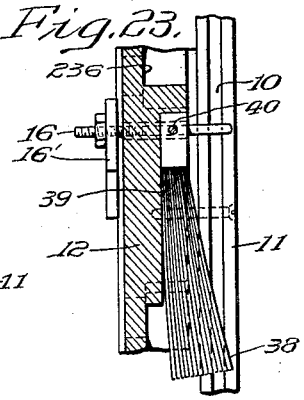
INVENTOR
Martin E. Brigham.
BY Blount, Moulton & Wilbur
ATTORNEYS
WITNESS
F. J. Hartman.

Patented Dec. 30, 1924.

1,520,747

UNITED STATES PATENT OFFICE.

MARTIN E. BRIGHAM, OF PHILADELPHIA, PENNSYLVANIA.

LABELING AND WAXING MACHINE.

Application filed December 28, 1922. Serial No. 609,402.

*To all whom it may concern:*

Be it known that I, MARTIN E. BRIGHAM, a citizen of the United States, and a resident of the city and county of Philadelphia, State of Pennsylvania, have invented a certain new and useful Labeling and Waxing Machine, of which the following is a specification, reference being had to the accompanying drawings.

It is customary to market lye, bleaching powder and other chemicals intended for household use in tin cans comprising a cylindrical body and a perforated lid which is permanently secured to the body after the contents are placed in the can, the perforations being temporarily closed by a paper label pasted on the upper side of the lid and adapted to be punctured by the user when it is desired to shake or sift out the contents of the can through the perforations. As the contents of the can are ordinarily of a hydroscopic character, it is desirable to render waterproof those portions of the label which close the perforations, which is ordinarily accomplished by spreading on the under side of the cover in the vicinity of the perforations a suitable quantity of hot wax, paraffine or the like after the label is applied and in such manner that the wax soaks into and impregnates the label in the vicinity of the perforations and also forms a thin waterproof coating across the perforations, thus preventing the entrance of moisture into the can and consequent deterioration of the contents so long as the label remains intact.

Hitherto, the several operations requisite for applying the paste and the label to the upper side of the lid and the waterproof coating to the lower side thereof have been performed by hand, and it is the object of the present invention to provide mechanical means for effecting these operations automatically and with great rapidity.

For the performance of these intended functions I therefore arrange suitable means and instrumentalities in suitably corelated and coordinated relation to form an organized machine adapted, among other things, to consecutively feed the perforated lids from a magazine, to apply an adhesive to the top of each lid, to apply a label to the gummed surface and preferably press the same thereon so as to secure positive adhesion of the label to the lid, to apply a coating of waterproof material in fluid condition to the under side of each lid in the vicinity of the perforations, and to then eject the lid conveniently onto a suitable conveyor by which it may be removed to suitable stacking mechanism adapted to arrange the completed lids in suitable stacks.

While for accomplishing the foregoing and other operations incident or requisite for the satisfactory performance of a machine adapted for carrying out the objects of the present invention, any suitable means or instrumentalities may be employed, for the purpose of enabling those skilled in the art to comprehend and practice the invention I have illustrated in the accompanying drawings and will now proceed to describe a preferred embodiment thereof which has been found in practice as entirely satisfactory in operation and well adapted for the performance of the requisite and desired functions. It will, however, be understood that it is not my intention or desire to thereby confine or limit myself to the utilization of any particular means for the performance of any or all of the various coordinated and corelated functions of the machine, more especially as I believe it to be broadly new to utilize mechanical means for the consecutive performance of the several operations requisite or desirable for the pasting of a label on one side of a perforated lid and the application of a waterproof coating to the other side thereof in such manner as to seal the perforations against the entrance of moisture.

Figure 9:
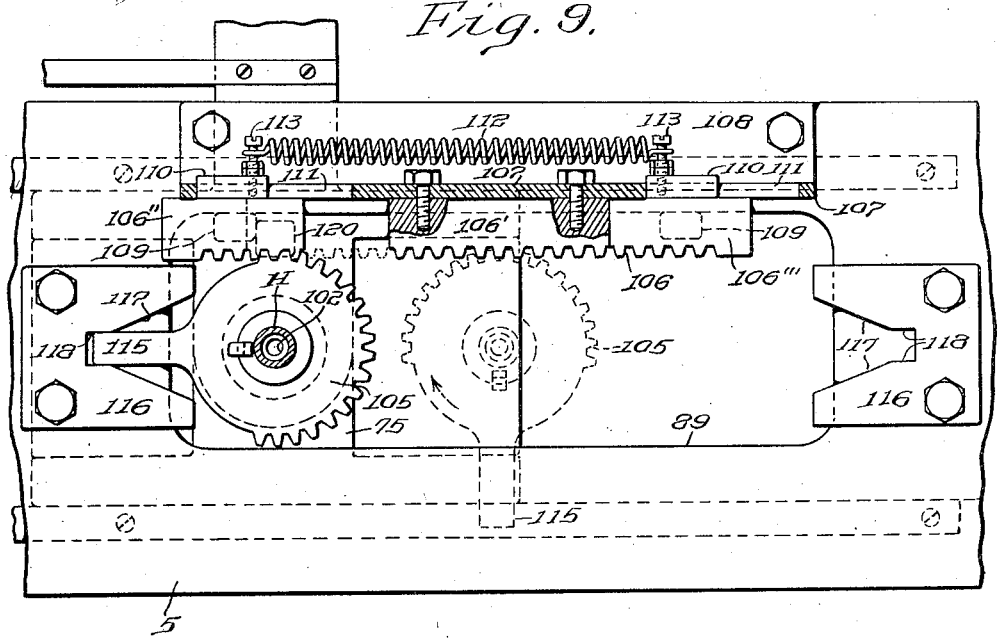
Figure 10:
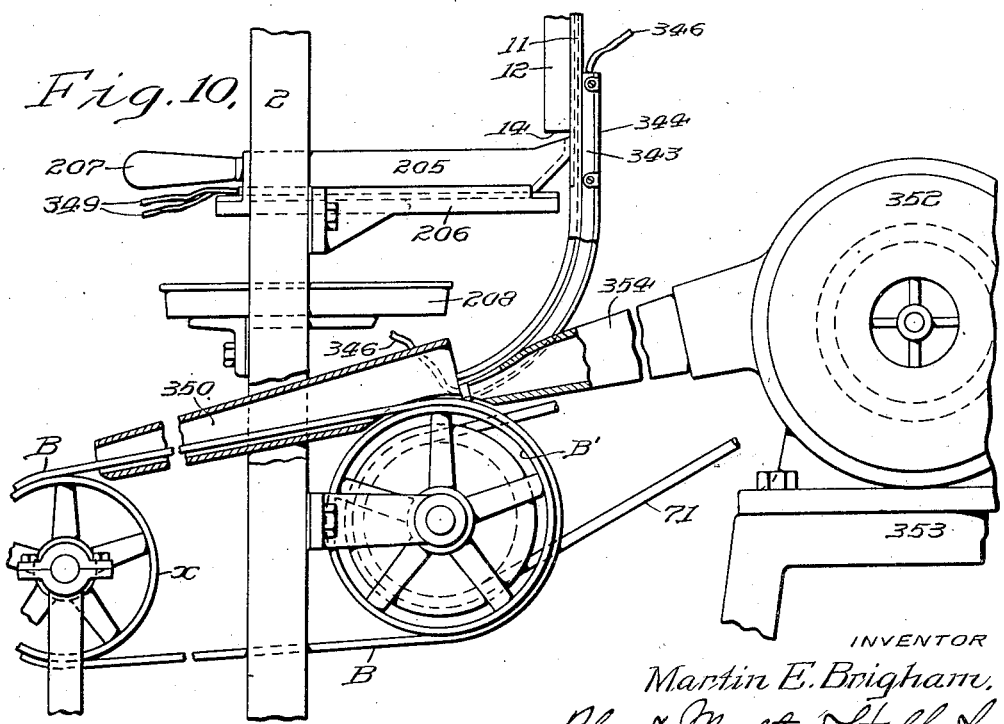
Figure 11:
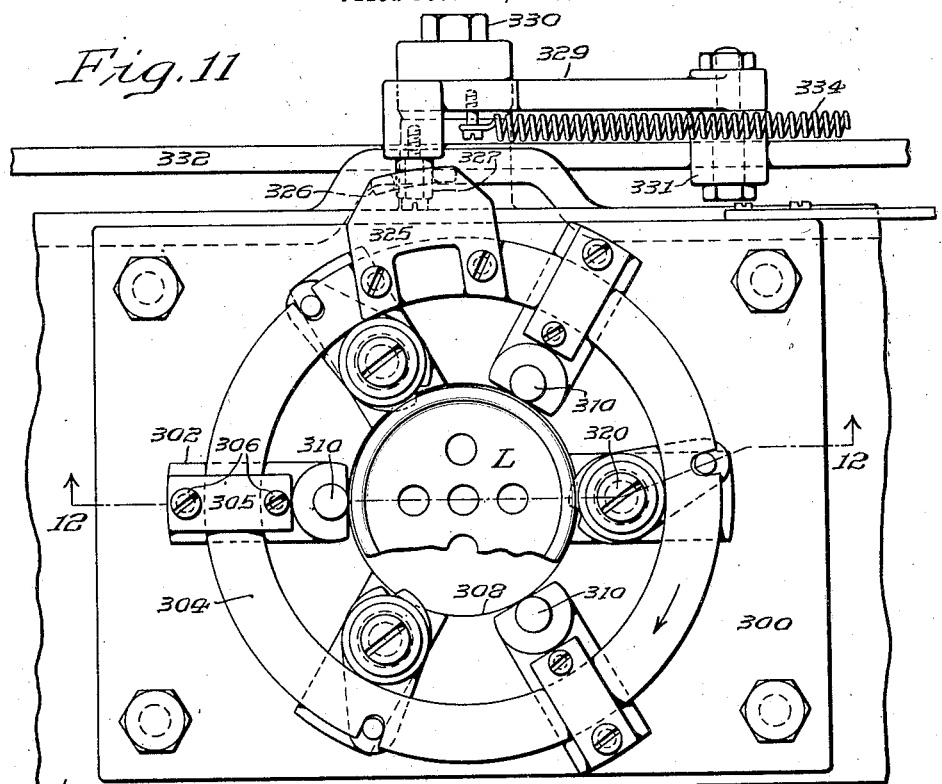
Figure 12:
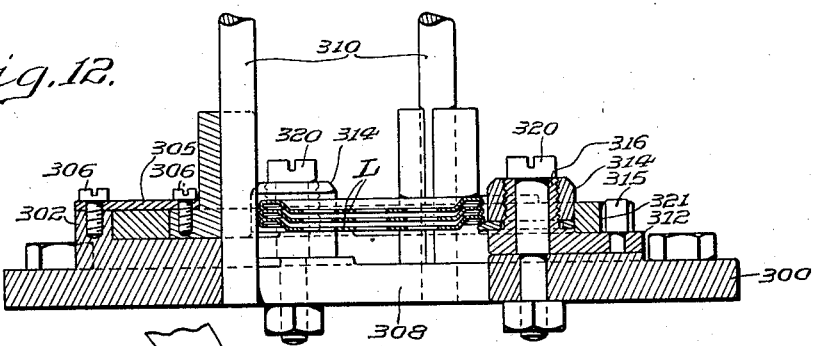
Figure 13:
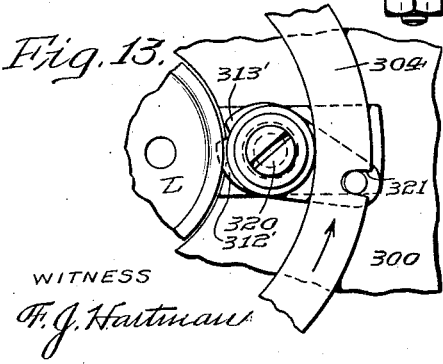
Figures 14, 15:

In the accompanying drawings, Figure 1 is a front elevation of the upper part of a machine constructed in accordance with the said preferred embodiment of the invention; Fig. 2 is a top plan view thereof; Fig. 3 is an end elevation of the machine with certain parts shown in vertical section; Fig. 4 is an enlarged fragmentary view partially in elevation and partially in vertical section adjacent one end of the machine and showing certain of the parts in a different position than that illustrated in Fig. 1; Fig. 5 is an enlarged fragmentary end view showing the cam shafts, cams and adjacent parts; Fig. 6 is a composite figure showing face views of the actuating cams removed from their supporting shaft and substantially in the relative positions in which they are operatively disposed thereon; Fig. 7 is a face view of the paste pan roll cam; Fig. 8 is an enlarged fragmentary view partially in elevation and partially in vertical section showing the slide and certain adjacent parts including the suction controlling valve; Fig. 9 is an enlarged top plan view showing the vertical arm-carrying shaft, actuating mechanism and adjacent parts; Fig. 10 is a view on substantially the same scale as Fig. 1 and partially in side elevation and partially in fragmentary vertical section showing the blower and conveying mechanism which are normally located beneath those portions of the machine shown in said figure; Fig. 11 is an enlarged fragmentary top plan view of the lid magazine and Fig. 12 is a section thereof on line 12—12 looking in the direction of the arrows. Fig. 13 is a fragmentary detail top plan view showing one of the blank controlling dogs in a different position than as illustrated in Fig. 11; Figs. 14 and 15 are respectively top plan detail views of certain parts of the dog in disassembled relation; Fig. 16 is an enlarged section on line 16—16 in Fig. 4 looking in the direction of the arrows and illustrating a preferred arrangement of the lid track and adjacent heating unit; Fig. 17 is a fragmentary detail top plan view illustrating the arrangement of the trip lever actuating mechanism; Fig. 18 is an enlarged side elevation of the connecting rod stud, a portion of the attached cam slide being fragmentarily shown; Fig. 19 is an enlarged view partially in side elevation and partially in section of the label holder assembled in the magazine housing and also showing the label push rod, and Fig. 20 is a front view thereof. Fig. 21 is a front view of the label holder removed from the housing and illustrating a convenient method of temporarily holding the labels therein while the holder is being inserted in position in the machine; Fig. 22 is a front elevation of a portion of the lid spout and adjacent parts showing one of the friction brushes in position, and Fig. 23 is a fragmentary section on line 23—23 of Fig. 22. Fig. 24 is a greatly enlarged view in central section of one of the completed lids showing the coating of adhesive, the label and the waterproof coating. Like numerals are used to designate the same parts in the several figures.

Referring to the drawings, the machine shown therein comprises, generally speaking, transversely disposed end frame members 2 and 3 to which are rigidly secured laterally spaced pairs of uprights 4 which are operative to support at their upper extremities a horizontally disposed top plate 5, a similarly disposed bottom plate 6 being arranged below and spaced at a suitable distance from the top plate. The top plate is adapted, among other things, to support the lid magazine and its attendant operating mechanism by which the lids which are stacked in the magazine are consecutively released therefrom and directed into suitable tracks secured to a vertically disposed spout extending downwardly from a point above the top plate, through the plates and for a suitable distance below the bottom plate at which point the spout is terminated and the tracks curved forwardly so as to direct the lids onto a suitable conveyor mechanism, and means are provided for arresting the movement of each lid as it passes along the tracks at suitable points or stations so as to afford opportunity for the application of the paste to the top of the lid, the application of the label to the pasted surface and the application of the waterproof coating to the under side of the lid by means suitable for the performance of these several operations.

Furthermore, generally speaking, the means for applying the paste and for affixing the label comprise a horizontally movable slide arranged between the top and bottom plates from which are supported a pair of vertically separated arms respectively arranged in substantially horizontal alignment with the paste applying and label applying stations. The uppermost of these arms is provided at its extremity with a pasting pad adapted to convey paste to the lid, and the lowermost of the arms with a suction pad adapted to receive and retain a label, and means are provided for imparting to the said arms simultaneous movements suitable to swing the arms from a position in which they are disposed to respectively receive paste from suitable paste applying mechanism and a label from a suitable label magazine to a position in which they are operative to respectively apply the paste and the label to lids disposed at the pasting and labeling stations on the tracks. Additionally, means are provided for suitably applying paste to the pasting pad carried by the upper arm in properly timed relation to the movement of the arm and for consecutively feeding the labels to the suction pad of the lower arm as will hereafter more fully appear.

The machine also embodies means for applying to the under side of each lid as it is momentarily held at the waxing station, which is preferably arranged beneath the bottom plate, a coating of wax, paraffine or other waterproof material (hereinafter for convenience referred to as wax) in fluid condition together with actuating means for said wax applying means arranged in properly timed relation with the other parts of the machine, as well as means for suitably warming the lids and portions of the machine adjacent the wax applying station to enable the wax or other waterproof coating to be satisfactorily applied to the lids, while, additionally, means are preferably provided for rapidly cooling the lids and their coating of wax after the latter has been applied and prior or substantially simultaneously with the transfer of the lids to the conveyor.

Thus, it will be understood that in the operation of the machine the lids are consecutively fed from the lid magazine at suitable intervals and pass into the tracks near the upper end of which each lid is retained momentarily at the initial or #1 station. The lid is then allowed to fall by gravity to the pasting or #2 station, at which the paste is applied to its upper surface by the pasting pad to which reference has hitherto been made. The lid then passes by gravity to the labeling or #3 station where the label is applied to the pasted surface by the pad carried by the lower arm, after which the lid is permitted to pass by gravity to the waxing or #4 station at which the waxing means are operated to apply a coating of wax to the lower side of the lid in such manner as to cover the perforations therein. The lid having now been labeled and waxed is released from the last station and permitted to slide downwardly out of its guiding tracks, a blast of cool air being preferably directed on the lid substantially as it passes onto the conveyor so as to chill the lid and its coating of wax as the conveyor becomes operative to remove the lid from the machine to the stacking mechanism or other suitable point.

Such, in brief, is the general arrangement and operation of the machine in the preferred embodiment illustrated, and the several means, instrumentalities and mechanisms utilized for accomplishing the various operations to which reference has just been made in a general way, as well as numerous other operations incident or related thereto will now be described with somewhat greater particularity.

*Lid guiding mechanism.*

The perforated lids L, ordinarily of sheet metal, and which are to be labeled and waxed are stacked one on top of the other in a magazine arranged above the top plate 5 and toward the forward end of the machine, that is, the left hand end thereof viewed as in Fig. 1 and adjacent the front side of the machine, that is, the side nearest the observer in said figure. As hereinafter more fully described, the magazine is operative to permit the lids to fall from the bottom of the stack consecutively and at suitably timed intervals, and as each lid is released it passes into a guiding trough 8 provided with a downwardly curving surface or bottom 9 which, when the lid contacts therewith, is operative to turn the lid from a horizontal to a substantially vertical position and thus enable the edges of the lid to enter the grooves 10 formed in the vertically disposed laterally spaced tracks 11 which are secured at the side edges of the rear face of the spout 12, this latter, which is preferably cast or otherwise formed in a single piece, extending vertically through suitable apertures in the top and bottom plates 5 and 6 and being rigidly secured to the plate by suitable brackets 13 or in any other convenient way. Preferably the spout extends for a considerable distance below the bottom plate to terminate at 14, from which point the tracks are continued downwardly and curved forwardly so as to terminate adjacent the conveyor belt B (see Fig. 10) this latter being arranged to pass over a pulley B' carried by a shaft journaled in a bracket supported from the frame member 2 and also over another pulley X disposed at any suitable point removed from the machine, for example adjacent the stacking mechanism by which the completed labeled and waxed lids may be finally arranged in stacks, said stacking mechanism, however, forming no part of the present invention.

Ordinarily the lids on which the machine is intended to operate are formed of thin sheet metal and are circular in shape, with the major or central portion C (see Fig. 24 showing a central section of the completed lid but greatly exaggerated) lying in a single plane and having a narrow edge E lying in a plane parallel to the central portion but slightly elevated therefrom and connected therewith by an angularly disposed web D, the outer extremity E' of the edge E being turned over and under and adapted to be crimped on the edge of the body of the can when the lid is finally assembled thereon.

The tracks 11 are therefore arranged in such manner that when the lid is guided thereinto by the curved bottom of the trough 8, diametrically opposed portions of the edge of the lid will loosely enter the grooves 10 so that the lid is guided and steadied but not impeded in its descent, and suitable means are provided for temporarily arresting the progress of the lid at the several stations during its progress along the tracks.

Preferably the said means may comprise suitably horizontally movable stop pins arranged to support the lid at the different stations in association with means for withdrawing the pins at the proper times from the path of the lid so as to permit it to fall from one station to another and finally to slide entirely clear of the tracks. More particularly a pin 15 is arranged to hold the lid at initial or #1 station, a pin 16 to hold it at the pasting or #2 station, a pin 17 to hold it at the labeling or #3 station and a pin 18 to hold it at the waxing or #4 station, the first three of said pins extending toward the rear of the machine through suitable apertures arranged substantially on the center line of the spout 12 and the latter extending in the opposite direction as hereinafter more fully described. Each of the pins 15, 16 and 17 is respectively rigidly secured to a laterally extending bracket 15', 16', 17' and the brackets are in turn respectively fixed to the upper ends of the push rods 19, 20 and 21 (see Fig. 3). These rods are each substantially L-shaped, one portion of each rod extending vertically downward from its respective bracket adjacent the front end of the machine and the other portion extending horizontally rearward beneath the bottom plate 6 through suitable supporting guides 22 secured to the under side thereof, each push rod being provided at its rearmost extremity with a cam follower 23 adapted for cooperation with suitable cams 19', 20', 21' as the case may be, mounted on a transversely extending cam shaft 25 and adapted to impart longitudinal movement to its respective rod so as to move the pin supported by that rod from a position in which its point extends between the tracks 11 and into the path of the lid, for which it forms a temporary support, to a position in which the pin is withdrawn from the path of the lid to thereby allow the lid to fall to the subjacent station. In order to constantly urge the rods toward the rear of the machine and maintain the cam followers on their respective cams, suitable tension springs 26 may be secured between one of the brackets 22 and a pin carried by each rod.

The pin 18 which forms the support for the lids at the waxing station is also actuated in a generally similar manner, conveniently by means of a push rod 28 which extends through the supporting brackets 22 parallel to the other rods, like them is provided with a follower 23 and a spring 26, and is actuated in a similar way from a suitable cam 28' on the cam shaft 25. It will be apparent, however, from an inspection of Figs. 1 and 4 that for the purpose of withdrawing pins 15, 16 and 17 from the path of the lid the push rods controlling those pins are moved toward the front of the machine, whereas for effecting a similar function with respect to pin 18 the rod 28 is moved toward the rear of the machine and the several cams 19', 20', 21' and 28' are suitably designed to bring about this result.

While the pin 18 may be rigidly supported in a bracket secured to the end of the rod 28 as in the case of the other pins, I prefer to arrange this pin so that it is capable of being manually moved longitudinally with respect to its bracket, and for this purpose I may extend the pin through a hollow sleeve 30 disposed at the lower end of the bracket 29 which in turn is secured to rod 28. Within the sleeve the pin is provided with a collar 32 and surrounded by a spring 33 held in position by a hollow plug 34 screwed into the end of the sleeve in such manner that the spring tends at all times to force the pin toward the tracks but may be compressed by drawing the outer end of the pin, which may be provided with a knurled head 35, away from the tracks so as to clear the end of the pin from the path of the lid when required. Thus, if when adjusting the machine or for any other purpose it be desired to permit the lids to pass the waxing station without arresting them at that point, the pin may be manually withdrawn, and if the plug be provided with a radial slot 36 and the pin 18 with a radially extending pin 37 slidable therein, the former may be readily retained in such retracted position if pulled out far enough to clear pin 37 from the slot and permit it to be turned against the end of the plug.

Owing to their light weight and more or less resilient character, it is found that when the lids fall from one station to another in the absence of means for promptly bringing them to rest, they tend to rebound from the stop pins, and for preventing this result and insuring each lid coming immediately to rest when it strikes the pin at each station, I preferably provide suitable means adapted to frictionally engage the lids in their fall and thus minimize the force with which they strike the several pins. For this purpose I may utilize small brushes 38 (see Figs. 22 and 23) positioned in suitably disposed, vertically extending sockets 39 formed in the spout 12 adjacent the several stations, each brush being supported on a pin 40 extending inwardly from the edge of the spout in such manner that the free ends of its bristles project into the path of the lids, thereby providing sufficient friction to slightly retard the descent of the lids and bring them quietly to rest on the subjacent pin at each station.

*Cam shaft actuating means.*

The cam shaft 25 on which are mounted the cams for controlling the push rods 18, 19, 20 and 28 hereinbefore referred to, as well as certain other cams hereinafter described, extends transversely beneath the bottom plate near the rear end of the machine and is journaled at the lower end of the cam shaft bearing housings 45 and 46 which are secured in vertical position at opposite sides of the bottom plate 6, the latter being provided with vertically extending lugs 47 stiffened by webs 48 for their support. The housing 45 is provided at its lower end with a cap 50 forming the lower half of the journal for the adjacent end of the shaft 25 while preferably the lower end of the housing 46 is laterally extended as at 51 and provided with a cap 52 forming the lower half of the journal for the shaft on that side, and thus providing an extended bearing surface adjacent the point where the drive is imparted to the shaft, while extending above and parallel to the shaft 25 is the upper cam shaft 55 which is journaled at the upper ends of the cam shaft bearing housings which are respectively provided with caps 57 and 58 disposed above the shaft. This cam shaft is operative, among other things, to support and actuate the paste roll cam 59 hereinafter described.

Beyond the cam shaft bearing housing 46 and more or less adjacent the center line of the machine, the upper cam shaft is provided with a crank generally designated as 60, from whence the shaft passes into a gear box 62 in which is disposed suitable reduction gearing (not shown) which may be of the worm and worm wheel or any other suitable type, operative to suitably reduce the speed of the driving motor M which is connected with the gearing within the gear box through the medium of a shaft 63 and coupling 64, both the motor and gear box being mounted on a horizontally disposed table 65 secured to the frame adjacent the back of the machine as best shown in Fig. 2.

Between the crank and the gear box a large gear 68 is mounted for rotation with the shaft and arranged for meshing engagement with a preferably similar gear 69 mounted on the end of the lower cam shaft 25; thus rotation of the upper cam shaft is effective to drive the lower cam shaft at a corresponding speed but in the opposite direction. The lower cam shaft may also be provided with a pulley 70 adjacent the gear 69 which is utilized, through the medium of a belt 71, to drive the pulley 15 forming part of the conveyor mechanism hereinbefore referred to, although if desired, other means for driving the conveyor may be employed. Additionally, the upper cam shaft is preferably provided with a sprocket 73 for the purpose of actuating the paste pan roll forming part of the pasting mechanism hereinafter more particularly described.

It will thus be evident that the motor M is operative to effect rotation of the upper cam shaft and crank 60 through the reduction gearing housed in the gear box 62 as well as rotation of the lower cam shaft and pulley 70 with corresponding actuation of the conveyor mechanism if belted to the pulley, the said movement of the crank being availed of for the actuation of the slide mechanism now to be described.

*Slide mechanism.*

Disposed between the top and bottom plates 5 and 6 is a slide 75, best shown in Fig. 8, which is preferably of substantially channel shape, comprising upper and lower horizontally disposed members 76 and 77 connected adjacent their back edges by a vertically extending web 78 having an outwardly extending boss 79 drilled for the reception of the stationary connecting rod stud 80 rigidly secured therein by a set screw disposed in the interiorly threaded bore 79'. This stud (see Fig. 18) is provided with a centrally disposed squared boss 81 for a purpose hereinafter described and with a cylindrical portion 82 adapted for the reception of one end of the connecting rod 84 which is maintained in place thereon by a nut 85 threaded onto the end of the stud or in any other suitable way, the opposite end of the rod being journaled on the crank 60.

The upper and lower members of the slide are respectively disposed between suitable gibs 88 secured to the under face of the upper plate 5 and to the upper face of the lower plate 6. The surfaces of the members adjacent the gibs, the gibs and the upper and lower plates 5 and 6 are smoothly finished so that the slide may readily move back and forth between the plates in correspondence with the movement of the connecting rod when actuated by the crank, the gibs, of course, constraining the slide to move in a rectilinear path.

Journaled in the upper and lower members of the slide, which are provided with suitable bosses for this purpose, and extending above the upper member 76 and through a suitable opening 89 in the top plate is an arm carrier shaft 90 to which, between and respectively adjacent the upper and lower members of the slide are rigidly secured the paste carrier arm 91 and the label carrier arm 92, said arms being disposed in parallel relation one above the other and being, of course, rotatable with the shaft. Preferably a ball thrust bearing generally designated as 93 may be disposed between the label carrier arm and the member 77 so as to support the weight of the parts with a minimum amount of friction.

The paste carrier arm is provided at its outer extremity with a head 95 having a circular face slightly less in diameter than the central part C of the lid L, said face being preferably provided with a resilient pad 96 of rubber or other material suitable for receiving the paste, in a manner hereinafter described, and for thereafter applying it to the lid, and in a somewhat similar manner the label carrier arm 92 is provided with a head 98 substantially of the diameter of the label and preferably provided at its outer extremity with a resilient pad 99 of rubber or other suitable material adapted to receive the label from the magazine and thereafter apply it to the lid. The pad 99 and the head 98 are provided with ports 100 communicating with a central port 101 extending through the arm and in turn communicating with a passage 102 closed at its lower end and extending upwardly through the shaft 90 to the upper end thereof, a nipple 103 screwed into the end of the shaft and extending thereabove providing a suitable point of attachment for a suction hose H which leads to a suitable suction pump (not shown) and which is operative to maintain a constant suction in the passage 102 for a purpose hereinafter described.

Carrier shaft rotating means.

In the operation of the machine, paste is applied to the pad 96 and a label picked up by the pad 99 when the slide is at the rearward end of its movement with the carrier arms pointing to the rear, that is, toward the right hand end of the machine as viewed in Fig. 1, after which, through the operation of the connecting rod and corresponding rectilinear movement of the slide towards the front end of the machine in conjunction with the means now to be described, the arms are first given a short forward movement of longitudinal translation, then a combined movement of translation and of rotation about the axis of the carrier shaft thus swinging the arms through an angle of substantially 180° and then another short forward movement of longitudinal translation so as to apply the paste and the label to the lids respectively positioned at stations #2 and #3 on the tracks 11.

It will be apparent that the said movements of translation will be effected through the operation of the connecting rod which, as stated, imparts to the slide and in turn to the parts carried thereby a rectilinear movement equal in length to twice the throw of the crank 60, and for effecting the movement of rotation of the shaft 90 with its attached carrier arms, the shaft is provided above the top plate 5 with toothed segment 105 fixed thereto and adapted to mesh with a rack generally designated as 106. This rack is composed of three parts, namely, a central part 106′ which is rigidly bolted or otherwise secured to the vertical web 107 of an L-shaped bracket 108 bolted to the top plate 5 near its rear edge, the center of this portion of the rack being preferably equidistant from the ends of the path of travel of the slide, and of two relatively movable parts 106″ and 106‴ respectively disposed at opposite ends of the central portion of the rack and each provided with a downwardly depending tongue 109. Each of these movable portions 106″ and 106‴ is provided with a rearwardly extending lug 110 which projects through a slot 111 formed in the adjacent end of the web 107 and is slidable therein, and means are provided for normally holding the parts 106″ and 106‴ against the stationary part 106′ of the rack, said means conveniently comprising a spring 112 having its ends secured to pins 113 respectively mounted in the lugs 110, the tension of this spring being sufficient to normally pull the movable parts of the rack toward each other and into engagement with the ends of the stationary part, under which conditions the teeth on all three parts of the rack form a single continuous toothed surface adapted for cooperation with the toothed segment 105.

The segment, opposite its toothed portion, is provided with a radially extending dog 115 adapted for cooperation with centering yokes 116 secured to the top plate adjacent opposite ends of the aperture 89 and preferably arranged above and parallel to the carrier arms. Each yoke conveniently comprises a horizontally disposed plate having a generally V-shaped opening 117 with its wider end directed toward the aperture 89 and having its smaller end formed with parallel sides 118 symmetrically disposed with respect to the path of travel of the axis of the carrier shaft 90 and spaced apart sufficiently to permit the entrance of the end of the dog 115 snugly therebetween. If desired, however, the yokes may be formed with apertures of other shapes adapted for cooperation with the dog or equivalent means in such manner as to snugly receive the dog as the slide approaches the end of its travel and prevent rotation of the toothed segment, and in turn of the carrier shaft, while the dog remains in cooperative engagement with the yoke.

The operation of the means for rotating and translating the carrier shaft will be clearly apparent by reference to Fig. 9, in which the position of the toothed segment, rack member 106″ and adjacent parts when the slide is at the forward end of its travel are shown in full lines and the positions of the toothed segment and rack member 106″ when the slide is at the center of its travel are indicated in dotted lines. Referring to said figure and assuming the slide to be at the center of its travel, the toothed segment is in a position (as shown in dotted lines) in which substantially the center of its toothed portion is in engagement with the teeth at the center of the rack, the dog is directed at right angles to the line of travel of the slide, and both of the movable parts 106″ and 106‴ of the rack are in engagement with the ends of the part 106′. As the slide moves forwardly, that is toward the left hand end of the machine viewed as in Fig. 1 from this position, the engagement of the toothed segment with the teeth of the rack will cause the segment to rotate in the direction of the arrow in Fig. 9 and thus swing the arms 91 and 92 from a position substantially at right angles to the line of travel of the slide to a position substantially parallel thereto with the heads of the arms directed toward the front of the machine. The dog has now reached a position in substantial alignment with the opening in the forward centering yoke 116 toward which it is directed while the movement of the slide has brought the latter to a position in which an upwardly extending lug 120 with which the slide is provided engages the lug 109 of the movable rack member 106″. Further movement of the slide is now effective to move the rack member 106″ bodily away from the stationary part 106′ of the rack against the tension of the spring 112, the teeth of the toothed segment meanwhile remaining in meshed engagement with the teeth on the member 106″. As the slide approaches the end of its movement the dog 115 enters that part of the centering yoke having the parallel sides 118 so that the dog, and in turn the carrier shaft 90, is locked against any possible rotative movement or lost motion and the arms 91 and 92 are thus brought into proper registry and alignment to accomplish their intended functions of applying the paste and the label.

Upon the reverse or rearward movement of the slide, the dog is first moved longitudinally out of the forward centering yoke during which operation the spring 112 is effective to keep the lug 109 against the dog 120, the toothed segment and rack member 106″ moving rearward but remaining relatively stationary until about the time that the latter comes into contact with the end of the stationary rack member 106′, after which, during the further movement of the slide, the toothed segment is rotated in reverse direction by its engagement with and travel along the rack through an arc of substantially 180° until the dog 120 comes into engagement with the lug 109 on the movable rack member 106‴, after which that member moves bodily with the toothed segment, in the manner already described with reference to the part 106″, and the dog 115 enters the rear centering yoke so as to properly align the arms 91 and 92 for the reception of the paste from the pasting mechanism and to pick up a label from the magazine.

It will thus be apparent that by the use of the aforesaid mechanisms I am enabled to so operate the paste and label carrier arms that, beginning with the position in which they are adapted to receive the paste and label, they are first moved longitudinally for a sufficient distance to clear them from the pasting roller and from the label magazine, then swung through an arc of substantially 180° to point the arms in the opposite direction and at the same time bodily translated toward the forward end of the machine, and finally moved longitudinally forward to apply the paste and the label, and that during all or the major portion of this last mentioned movement the arms are positively constrained to move in a rectilinear path irrespective of any play or lost motion which may be present between the several parts, thus effecting proper and accurate registration of the heads of the arms with the lids to which the paste and label are to be applied. In like manner, after the application of the paste and label, and on the rearward stroke of the slide similar movements but in reverse order are imparted to the arms thus finally positively bringing them to proper position to receive fresh paste and a new label preparatory to the initiation of the ensuing cycle.

*Paste applying mechanism.*

Suitable means are provided for applying paste to the pad 96 while it is at rest at the rearmost point of its travel, said means conveniently comprising a pasting roller 125 journaled on a shaft carried in boxes longitudinally slidable in forks 127 disposed at the forward ends of the laterally spaced arms of the paste roller fork 130, small springs 129 arranged in the rear of the boxes being effective to urge the roller forward so as to insure proper contact between the roller and the pad 96. The roller fork is horizontally pivoted between its ends on a shaft 131 carried in a bracket 132 mounted on the top plate 5 and is provided at its rear end with a cam follower 134 adapted for cooperation with the paste roll cam 59 on the upper cam shaft, said cam being operative to depress the forward end of the paste roller fork and cause the pasting roller to traverse the pad 96 at the proper time in the cycle of operations of the machine.

Means are also provided for forcing the rear end of the glue roller fork downwardly so as to elevate the front end thereof and cause the pasting roll to engage the paste pan roll hereinafter described so as to receive the paste therefrom, said means preferably comprising a plunger 136 provided with a roller 137 at its lower end adapted to press against a seat 138 formed near the end of the paste roller fork. This plunger extends upwardly from the paste roller fork through the top plate 5 and within a cylindrical casing 139 secured thereto and having a cap 140, a coil spring 141 disposed within the casing and engaging a collar 142 carried by the plunger being operative to constantly yieldingly force the plunger and in turn the rear end of the paste roller fork downwardly with consequent elevation of the pasting roll to bring it into engagement with the paste pan roll save when the rear end of the paste roller fork is temporarily elevated by the cam 59 to cause the paste roll to descend and traverse the pad 96 to deposit a coating of paste thereon.

The reserve supply of paste is preferably contained in a paste pan 150 supported from the top plate and depending into a suitable opening therein, and positioned partially within and partially forwardly overhanging this pan and in such manner as to constantly dip into the paste therein is the paste pan roll 151 conveniently mounted on a shaft 152 extending transversely of the pan. In order to permit the roll to be readily lifted from the pan for cleaning, the shaft 152 is journaled beneath hinged caps 153 operatively retained in place by thumb nuts 154, the arrangement being such that by loosening the thumb nuts the caps can be turned up out of the way to allow the roll to be lifted out of the pan. Additionally the pan itself is preferably removably mounted on the top plate by wing nuts 155 so it also may be readily removed from the plate when desired.

Conveniently the front end of the paste roll shaft 152 is provided with a knurled knob 157 through the medium of which the shaft may be conveniently manually rotated if desired and at its opposite end with a ratchet wheel 158 adapted for engagement with a pawl 159 carried by a sprocket wheel 160 mounted on a short shaft 161 journaled in a bracket 162 secured to the rear edge of the top plate or other suitable point, the sprocket being adapted to be driven by a chain 164 from the sprocket 73 mounted on the upper cam shaft. While in certain constructions the paste pan roll shaft 152 might be driven directly from the sprocket 160 by mounting the latter upon the shaft, I prefer to effect the drive of the shaft through some means such as the pawl and ratchet wheel just described in order that the paste pan roll may be removed without the necessity of dismounting the sprocket and chain; a construction which furthermore permits the manual rotation of the shaft by knob 157 when desired, as for example, when adjusting the machine.

The relative position of the pasting roll and the overhanging portion of the paste pan roll is such that when the rear end of the paste roller fork 130 is compressed by the spring pressed plunger 136, the pasting roll will be brought into engagement with the paste pan roll and for the purpose of evenly distributing the paste from the latter over the former, I preferably provide a pinion 165 at a convenient point on the paste roll shaft and a gear 166 on the paste pan roll shaft 152 in vertical alignment therewith, so that as the two rolls are brought into contact the pinion will mesh with the gear and as the latter is continuously revolving the paste roll shaft will be thereby rotated. Hence, as the paste pan roll is preferably of considerably greater diameter than the pasting roll and the gear and pinion conveniently of correspondingly different diameters, the pasting roll will be given one or more complete turns during its period of contact with the paste pan roll thereby insuring the distribution of the paste over its entire surface. If desired, in order to evenly distribute the paste over the paste pan roll and prevent the accumulation of excessive quantities of paste thereon, a suitable scraper 169 may be adjustably disposed on the upper surface of the paste pan in proximity to the rear edge of the roll so as to scrape all but the desired quantity of paste from the roll as it emerges from the paste in the pan.

Label magazine.

The labels which are to be applied to the lids are consecutively supplied to the pad 99 carried by the arm 92 from a magazine supported on the bottom plate 6 and so arranged that the labels may be loaded thereinto in relatively considerable quantities and then fed to the pad as required. While this magazine may be of any suitable construction, I prefer to secure on the bottom plate in suitable position for registry with the pad 99 when the arm 92 is in its extreme rearmost position a vertically extending block 175 forming a magazine housing, this block being provided with parallel, vertically spaced overhanging ways 176 on its rear face. The housing is also provided with a circular bore 177 extending entirely through the housing from front to rear in axial alignment with the pad 99 and of a diameter slightly greater than the diameter of the labels, the forward end of this bore being enlarged and internally threaded for the reception of a magazine ring 180 which is screwed thereinto to lie flush with the forward face of the magazine. This ring is preferably radially drilled at intervals to receive the label retaining pins 181 which are driven into or otherwise secured in the drilled apertures in such manner that the inner ends of the pins, which are preferably sharpened to provide thin blades aligned with the axis of the bore, will extend inwardly for a short distance beyond the interior of the ring and thus form stops to prevent the labels being forced out of the magazine by the pressure applied to the rear end of the stack of labels as hereinafter described, the pins, however, not projecting inwardly far enough to prevent the foremost label from being readily withdrawn when required.

The labels are contained in a label holder 183 conveniently comprising a hollow cylinder of suitable diameter having a square plate 184 secured to its forward end and of suitable height to be slid laterally into and retained by the ways 176 on the rear face of the magazine housing, the plate being provided with a central circular aperture aligned with the interior of the cylinder. For insuring the proper alignment of the label holder with the bore 177 when the plate is slid into position in the ways, suitable stops 185 are arranged on the rear face of the housing to project into alignment with the ways and a spring pressed pin 186, provided with a knurled head 187, is arranged to extend through the housing in such manner that its point can be entered into a small hole 188 formed at a suitable point in the plate after the label holder has been slid into the ways far enough to contact with the stops, thus removably retaining the holder in position.

Conveniently, the cylinder of the label holder has four small holes 190 drilled through its walls adjacent each of its ends, two of the holes at each end being arranged in axially aligned relation at a convenient distance above and parallel to its horizontal diameter and the other two being correspondingly arranged below said diameter, and a pair of U-shaped wires 191 are provided and formed so that their ends may be inserted through the pairs of holes at each end of the cylinder in the manner shown in Fig. 21.

In the operation of loading the label holder one of the wires 191 may be inserted in the holes at one end of the cylinder, for example, at the forward end and the labels then stacked in the cylinder and against the wire until the other end of the stack substantially reaches the holes in the other end of the cylinder when the labels are firmly pressed down in the holder, after which the other wire 191 is inserted through the holes in that end of the cylinder thus confining the stack of labels between the two wires. The label holder may now be inserted in the ways on the magazine housing and secured in position by means of the spring pressed pin, after which the wires may be withdrawn to permit the front end of the stack of labels to rest against the label positioning pins and the rear end of the stack to contact with a plunger head 192 carried at the forward end of a plunger 193 which extends through a suitable guide 193' rearwardly beyond the line of the frame 3 and provided at its opposite end with a clip 194 to which is secured a cord 195 passing over a sheave 196 supported from the frame and terminating in a weight 197 in such manner that the plunger is continuously urged forward so as to press the stack of labels in the holder against the positioning pins. For temporarily holding the plunger in retracted position when the label holder is being inserted or removed from the machine, I may provide a spring pressed latch 198 mounted on the guide 193' and cooperative with a notch 199 in the plunger.

If desired, a paste drip pan 200 may be secured to the upper part of the magazine housing for the purpose of catching any paste which may fall from the paste rollers and adjacent parts.

*Wax applying mechanism.*

As hitherto stated, the waterproof coating, conveniently referred to as wax, is applied to the under surface of each lid after it comes to rest upon the pin 18 during its passage down the tracks 11 and the mechanism by which this operation is preferably effected will now be described. The wax is contained in a wax pan 205 of suitable form and open at the top which is removably supported on a bracket 206 secured to the frame member 2 below the bottom plate 6, the pan preferably being of such length that when in position on the bracket its rear end will lie closely adjacent the tracks 11. Conveniently, the pan may be arranged to slide in and out on the bracket which is provided with suitable ways for this purpose, a handle 207 being secured to the pan to facilitate its ready removal, and, if desired, a drip pan 208 may be disposed at a suitable distance below the bracket to catch any overflow of wax from the pan, in which, during operation, the wax is kept in a fluid condition by suitable heating means hereinafter described.

Secured to the under side of the bottom plate 6 above the wax pan is a bracket 210 provided with downwardly depending, laterally spaced arms having a horizontally disposed transversely extending rock shaft 211 journaled at their lower extremities. Between the arms of the bracket and pinned or otherwise secured to the shaft so as to turn therewith is a brush shaft carrier 213 conveniently of generally yoke-like form and comprising a pair of spaced jaws 214 bored for the passage of the brush shaft and united by a suitable web 215, the carrier being enlarged for the passage of the rock shaft adjacent the juncture of one of the jaws and the web. Extending through the jaws and rotatable and slidable therein is a brush shaft 216 provided at one end with a head 217 having a recessed face in which is disposed a removable waxing brush 218 of suitable form for conveying wax from the waxing pan and applying it to the lid. For the purpose of normally keeping the shaft in retracted position, that is, with the brush most nearly adjacent the carrier, a spring 219 is disposed between one of the carrier arms and a pin 220 extended through the shaft in such manner that the spring acting against the pin will constantly tend to yieldingly draw the head 217 toward the carrier. On the end of the shaft opposite the head and on the outside of the adjacent jaw a ratchet wheel 222 is preferably suitably secured as by a lock nut 223 for a purpose to be hereinafter described.

Suitable means are provided for actuating the rock shaft 211 at properly timed intervals in the operation of the machine, said means conveniently comprising a crank arm 225 mounted on the front end of the rock shaft and connected by a link 226 with a stud 227 carried by a depending arm 228 rigidly secured to the slide 75 so that as the slide is reciprocated an oscillating motion is imparted to the rock shaft operative to move the brush carrier from a substantially horizontal position as shown in Fig. 1, to a substantially vertical position as shown in Fig. 4, in which latter position the bristles of the waxing brush dip into the wax pan sufficiently to become coated with the fluid wax preparatory to applying the same to the lid.

I also prefer to provide means for intermittently rotating the brush shaft in order that the wear on the brush may be evenly distributed and for this purpose I may mount on one of the arms 210 a spring pressed pawl 230 in such position that when the brush end of the brush shaft is swung downwardly the ratchet wheel 222 can pass the pawl but when the brush carrying end of the brush shaft is elevated the nose of the pawl will engage the ratchet wheel and effect a partial rotation of the brush shaft. Thus, in each complete oscillation of the brush shaft a certain amount of axial rotation is imparted to it and the wear on the brush thus evenly distributed.

Furthermore, as in order to insure proper and adequate application of the wax to the lid it is desirable to effect the contact of the waxing brush with the lid by a movement at right angles to the surface of the latter rather than by a sweeping movement across the lid, I preferably provide means for imparting to the brush a movement of translation toward the lid after the brush has been swung up to a position in substantial alignment therewith and for retracting the brush away from the lid in a line normal thereto prior to its being again swung down toward the waxing pan. Conveniently for this purpose I may provide a trip lever 231 provided with adjusting screws at each end and pivoted substantially at its center on a horizontal pivot shaft supported in lugs 232 extended forwardly from the bracket 210. The lower end of the lever is adapted to contact with the end of the brush lever 216 and the upper end with the forward end of a trip lever push rod 233 extending beneath the bottom plate 6, through the guides 22 and terminating adjacent the lower cam shaft 25 where it is provided with a follower, similarly to the other push rods, adapted for cooperation with a suitable cam 233' mounted on the lower cam shaft, the arrangement being such that the push rod under the influence of the cam is operative to bring the adjusting screw at the lower end of the trip lever against the end of the brush shaft after the latter has been swung up to substantially horizontal position as shown in Fig. 1 and thus force the shaft and brush to the right, when viewed as in said figure, to carry the brush into positive contact with the under surface of a lid suported at the waxing station on the pin 18, the coil spring 219 being operative to retract the shaft in the carrier and away from the lid as soon as the pressure exerted on the shaft by the trip lever is released by further revolution of the cam 233'.

*Contact pads and actuating mechanism.*

In order to insure the proper pasting of the lid, the firm adhesion of the label to the pasted lid and the proper spreading of the wax on the under side of the lid at the several stations where these operations are accomplished, means are provided for effecting positive contact of each lid with the pad 96 on the paste carrier arm 91, with the pad 99 on the label carrier arm 92 and with the waxing brush irrespective of any slight inequalities in the lids or of any looseness or play of the lids in the grooves 10 in the tracks, any of which conditions in the absence of the said means now to be described might interfere with the positive performance of the said operations or some of them on each lid during its passage through the machine.

For this purpose therefore I provide in the preferred embodiment of the invention two contact pads 235 each conveniently comprising a disk of substantially the diameter of the central portion C of the lid and a forwardly extending central stem of smaller diameter, and dispose each pad in a circular recess 236 formed in the spout 12 one recess being in horizontal alignment with the axis of the paste carrier arm 91 and the other with that of the label carrier arm 92 as best shown in Fig. 4, the stem of each pad entering and being guided in a bore formed in a boss 237 extending rearwardly from the spout. Extending through each boss and threaded into the end of the adjacent stem is a headed pin 238 between the head of which and the boss is disposed a compression spring 239 which normally tends to draw the contact pad into the recess in the spout to a normal position in which the rear face of the pad is out of alignment with the path of the descending lids as they move along the tracks. In order to relieve any air pressure or the creation of a vacuum within the recesses which might interfere with the proper operation of the pads I may provide ports 240 in the rear wall of the spout and leading into the recesses.

Means are also provided for moving the pads rearwardly from normal position in the recesses in such manner as to press the lids supported at the adjacent stations firmly against the pasting pad 96 and the label suction pad 99 when the carrier arms are at the end of their forward stroke, and for this purpose I may conveniently provide a trip lever 243 adjacent each of the pins 238 pivoted on a horizontally disposed shaft 244 journaled in a suitable bracket 245 secured to the adjacent top plate or bottom plate as the case may be. The free end of each of the trip levers may be arranged to carry an adjusting screw 247 provided with a lock nut 248 and so arranged that its rearmost end may, by a proper motion of the lever, be brought into engagement with the headed end of the adjacent pin 238.

For actuating each trip lever I may utilize any suitable means, conveniently a trip lever push rod 250 extending through a suitable guide 251 secured to the adjacent top or bottom plate in such manner that the rearmost end of the push rod will normally lie in the path of the slide 75 for a sufficient distance to permit the end of the slide to contact with the end of the rod as the slide approaches the end of its forward stroke and move the rod forwardly for a suitable distance. The opposite or forward end of each rod is suitably movably connected to the adjacent trip lever shaft, conveniently by slotting the rod as at 252 and extending a pin 253 across the slot about midway of its ends, said pin being cooperative with a fork 255 secured to the adjacent trip lever shaft in such manner that when the rod is moved forwardly from normal position (in which the parts are yieldingly maintained by the spring 239) the adjacent trip lever will be oscillated, thus forcing the end of the adjusting screw against the pin 238 and moving the adjacent contact pad rearwardly for a distance determined by the adjustment of the pin, for it will be understood that although the stroke of the push rods is constant and thus moves the trip levers through a constant arc, by suitable adjustment of the adjusting screws the amount of movement of the contact pad may be regulated as desired, and further that the tension of the springs 239 is sufficient to return the contact pads to normal position within their respective recesses whenever the pressure of the slide on the push rods is removed.

Substantially similar means are utilized for insuring adequate contact of the lid with the waxing brush at the waxing station, said means conveniently comprising a contact pad 260 substantially similar to the pads 235 already described, which is disposed in a recess in a housing 261 bolted to the lower part of the spout but on the side thereof opposite to that from which the bosses 237 project with the open face of the housing lying in substantial alignment with the adjacent edges of the track. This pad is provided with a rearwardly extending stem carrying a headed pin 262 and surrounded by a spring 263 in the manner already described in connection with pads 235, the housing being preferably provided with suitable relief ports 264 for the same purpose as the ports 240.

The actuation of the contact pad 260 is, however, preferably effected by means of a push rod 265 carrying an adjustable contact stud 266 and extending horizontally beneath the bottom plate through the guides 22 to a point adjacent the lower cam shaft 25 where it is provided with a cam follower (in a manner similar to the rods 19, 20, 21 hitherto described) cooperative with a suitable cam 265' carried by the lower cam shaft 25 and adapted to move the rod forwardly to in turn move the contact pad 260 into engagement with a lid at the waxing station at the proper time in the cycle of operations of the machine.

*Suction valve mechanism.*

In the operation of the machine the label carrier arm 98 is effective to transfer the labels consecutively from the label magazine to the lids, and suitable means are provided for causing the pad 99 to pick up the foremost label in the stack of labels in the magazine when the label carrier arm is adjacent thereto, to cause the adherence of the label to the pad during the movements of translation and rotation of the arm and to effect the release of the label as it is pressed against the lid at the labeling station, and for this purpose I preferably arrange for the creation at the proper time of a suitable suction or vacuum in the ports and passages 100 and 101 in such manner that the foremost label in the magazine will be drawn against and caused to adhere to the pad 99 when the latter is brought into proximity thereto and provide suitable means for releasing the suction substantially as the label is brought into contact with the lid at the labeling station so as to free the label from further adherence to the pad.

More particularly, and as hitherto stated, the nipple 103 communicating with the passage 102 may be connected by a hose H to a suitable suction pump (not shown) which is operative to continuously create a suitable suction in said passage and consequently through the ports 100 in the pad when in communication therewith, and I arrange a valve mechanism adapted at the proper time in the cycle of operations to cut off the ports from and to admit air to the passage thus relieving the suction at the ports, and at other times to close the passage against the admission of air save through the ports, thereby creating a suction thereat sufficient to cause the adherence of the label to the pad.

While this valve may be of any suitable form and construction, I prefer to provide the carrier arm 92 with a transversely disposed boss 270 bored from end to end for the reception of a cylindrical bushing 271 in which is slidably disposed a valve plunger 272 of sufficient length to extend beyond the bushing in either direction. This plunger is provided substantially at its center with a diametrically extending port 273 which is adapted in one position of the plunger to register with the port 101. The plunger is also centrally bored inwardly from one of its ends for a suitable distance to provide a passage 275 terminating in a transversely disposed diametrically extending port 276 which is adapted to register with the port 101 when the plunger is in another position, this port 276, however, only extending substantially half way through the plunger and opening toward the passage 102 in the carrier shaft 90.

Means are also provided for releasably holding the plunger either in a position in which the port 273 is aligned with the port 101 or the port 276 is aligned therewith, said means conveniently comprising a spring 278 secured to the exterior of the boss and adapted to cooperate with either of two notches 279 formed in the adjacent projecting end of the plunger, the configuration of the spring being such that it will engage in either notch so as to hold the plunger temporarily stationary in one of said positions but may be engaged in the other notch by suitable longitudinal movement of the plunger to similarly hold it in the other position.

In order to move the plunger from one position to the other, I may provide suitable plunger stops 280, 281 secured to the bottom plate 6 in a position to be respectively engaged by the adjacent end of the plunger toward the end of the stroke of the slide in either direction in such manner than when the slide approaches the end of its rearward stroke and the label carrier arm substantially reaches a position to receive a label from the magazine, the plunger will be moved so as to align the port 273 with the port 101, thus creating a suction through the ports 100 in the pad 99 sufficient to draw the label from the magazine past the stop pins 181 and cause its adherence to the pad until, near the end of the forward movement of the slide, the other end of the plunger comes into contact with the plunger stop 280 which pushes the plunger to a position to align the port 276 with the port 101 so that air can be drawn into the passage 102 through the passage 275 in the plunger, thus relieving the suction in the pad and permitting the label to adhere to the lid after it is applied thereto and the pad is moved away therefrom. Preferably those portions of the stops which contact with the plunger are suitably beveled so as to impart a smooth and progressive movement to the plunger as the slide approaches the end of its stroke in either direction.

Lid magazine.

The lids L prior to the labeling and waxing operations being performed thereon are arranged in a vertical stack in a magazine positioned above the spout and embodying mechanism suitable for consecutively releasing the lids at properly timed intervals to permit them to fall one by one into the guiding trough 8 by which they are transferred to the tracks.

While said magazine may be of any suitable construction, I prefer to employ a magazine table 300 supported on standards 301 secured to the top plate 5. This table is provided at spaced intervals with radially directed lugs 302 extending from its upper surface and grooved to provide a seat for an oscillatory, horizontally disposed magazine ring 304 which is maintained in the groove in the lugs by keepers 305 extending over the ring and held in position by screws 306. Conveniently three of the said lugs are provided, symmetrically disposed with respect to an aperture 308 formed in the plate 300 and of slightly greater diameter than the lids, the inner ends of the lugs adjacent the aperture being conveniently extended upward for a short distance above the plane of the ring and arranged to form sockets for the reception of the lower ends of the guide posts 310 which may be carried up for any suitable distance to form guides for the stack of lids.

Preferably symmetrically disposed between the lugs 302 are arranged movable lid feeding dogs each of which for convenience of manufacture may preferably comprise three parts, namely, a base 312 (see Fig. 15), blade washer 313 and lock nut 314. The base is provided at its outer end with an actuating pin 315 and near its inner with an upwardly extending, externally threaded and internally bored boss or sleeve 316 and with a small blade or lug 312' which projects slightly beyond the inner edge of the base at one side of a line drawn between the center of the actuating pin and of the threaded sleeve. Disposed on the base and surrounding the threaded sleeve is the blade washer 313 also provided with a thin blade 313' substantially similar in planary outline to the blade 312′, while the lock nut 314 is disposed on the upper end of the threaded sleeve and serves to hold the washer in relatively fixed position on the base and in such position that its blade will lie on the opposite side of the said center line and slightly above the blade 312′. Each dog is pivotally supported on the base 300 by a pivot bolt 320 so positioned that when the center line of the dog is on a diameter of the aperture 308 both blades will extend slightly over the aperture, but when the dog is moved about its pivot for a short distance in either direction from such position, one of the blades is withdrawn out of alignment with the aperture and the other blade projected further thereinto depending on the direction in which the dog is moved.

The magazine ring 304 is provided with notches 321 in number equal to the dogs and of suitable size for the reception of the actuating pins 315 which project thereinto in such manner that by suitable oscillation of the ring all of the dogs may be simultaneously moved in one direction or the other so as to move either set of blades 312′ or 313′ into or out of alignment with the aperture.

Means are also provided for effecting the requisite oscillation of the ring at properly timed intervals in the cycle of operations, said means conveniently comprising a rocker 325 secured to the ring and having a downwardly depending fork 326 overhanging the edge of the table 300, said fork being adapted to receive within its jaws a roller 327 supported at the end of one arm of a bell crank lever 329 pivoted to the top plate 5 on a pivot bolt 330 and having its other arm extending generally rearwardly and downwardly and provided with a cam roll 331 adapted to ride on the surface of a horizontally disposed cam slide 332 one end of which is extended through and supported in a guide 333 depending from the top plate and the other end secured to the square boss 81 on the connecting rod stud in such manner that reciprocation of the slide 75 will cause corresponding reciprocation of the cam slide, a spring 334 being interposed between the lever and some convenient fixed point so as to constantly press the roll against the slide.

The cam slide is provided with a high point or surface 335 and a low point or surface 336 connected by a diagonal surface 337 so positioned that when the slide 75 is toward the end of its rearward stroke the roll will rest on the high surface 335 thus maintaining the magazine ring in the position shown in Fig. 11 in which the stack of lids is supported on the blades 313′ while when the slide is toward the end of its forward stroke the roll will rest on the low point of the cam slide and the ring be moved to the position shown in Fig. 13 bringing the blades 312′ beneath the stack.

It will be understood that in the preferred embodiment of the invention the blades are of such form and are so arranged with respect to each other that as the dogs are moved from the position shown in Fig. 13 to the position shown in Fig. 11 the blades 313′ will enter between the first and second lids at the bottom of the stack slightly before the withdrawal of the blades 312′ from beneath the lowermost lid which, of course, permits that lid to fall into the trough. On the return oscillation of the ring the blades 312′ are again brought beneath the stack to afford the requisite support thereto prior to the complete withdrawal of the blades 313′; thus when the slide has completed about two-thirds of its rearward stroke, the roll passes up the low to the high point of the cam slide thereby actuating the magazine ring in a manner to permit the lowermost lid to drop from the stack into the guiding trough while at all other times the lids are prevented from dropping into the trough by the interposition of either the blades 312′ or 313′.

*Heating mechanism.*

In order to insure the proper application to and distribution of the wax on the lids, it is desirable to provide means for heating the contact pad 260 and adjacent portions of the tracks as well as for heating the wax contained in the wax pan, and while these heating operations may be effected by any suitable heating means, I prefer to employ electric heating units for that purpose, although in certain constructions I have obtained very satisfactory results by the use of properly directed gas flames. As stated, however, the use of electricity is preferred both by reason of the convenience with which it may be utilized and the elimination of fire risks which are always attendant on the employment of open flames. Thus, I may dispose adjacent the housing 261 one or more resistance elements 340 securing them by any suitable means to the exterior of the housing in such manner as to effect the requisite heating of the same, the current supplied to the elements through wires 341 preferably being controlled from a suitable rheostat (not shown). Moreover, to prevent any wax which may be dripping from the waxing mechanism or be otherwise spilled on the tracks from congealing thereon and thus interrupting the free passage of the lids along the tracks, I preferably warm the lower part of each track by means of a suitable heating element secured thereto to extend below the waxing station. This element may be of any desired form, for example, as shown in Fig. 16, a cylindrical element 342 disposed in a groove formed in a metallic strip 343 of suitable length and retained in place by a cover 344, a packing 345 of asbestos or the like being disposed between the element and the cover and the strip being bent to follow the configuration of the track and screwed or otherwise fixed thereto, current being supplied to the element by wires 346 preferably leading to a suitable rheostat (not shown).

For heating the wax in the wax pan 205 I may also dispose beneath the pan and on the supporting bracket 206 a suitable electric heating element or elements 348 supplied with current through wires 349 preferably controlled from a rheostat (not shown) by suitable regulation of which the tracks may be maintained in the desired condition of fluidity.

It will be understood that the heating or resistance elements or other heating means to which reference has been made may be of any of the well known commercial forms and of themselves form no part of the present invention, and I have therefore only illustrated the same in the drawings in a more or less diagrammatic way.

Conveyor and blower mechanism.

Reference has hitherto been made to a conveyor mechanism generally illustrated in Fig. 10 by means of which the lids after their passage through the machine may be conveyed to any suitable point, said mechanism conveniently comprising a conveying belt B passing over a pulley B' supported at some convenient point on the machine and over another pulley X suitably positioned at a point removed from the machine. To prevent the lids from falling off of the belt as they are ejected thereon from the tracks I prefer to enclose all or a portion of the belt in a box or housing 350 of suitable size to permit the belt to pass freely therethrough but operative to maintain the lids on the belt. Moreover, as the wax is applied at a relatively high temperature and in fluid condition and as the lids themselves have been more or less heated through contact with the pad 260 and by their passage over the heated tracks, I prefer to provide means for rapidly cooling the coated lids, said means conveniently comprising a blower 352 of any suitable construction and driven from any convenient source of power disposed on a base 353 and provided with a spout 354 arranged to direct the blast of air from the blower upon the lids at substantially the time when they pass from the track to the conveyor, but any other means suitable for effecting relatively rapid cooling of the lids after they are coated with wax may be employed if desired.

Operation.

While it is believed that the operation of the machine will be substantially evident from the foregoing description without additional extended explanation, for the purpose of convenience a relatively brief reference will now be made thereto.

Before operating the machine a stack of perforated lids is placed in the lid magazine, the label holder filled with labels and inserted in the magazine housing, the paste pan filled with suitable paste and the wax pan with wax, and the heating mechanism preferably operated to bring the wax to the requisite state of fluidity and to warm the contact pad 260 and the tracks in the vicinity thereof.

Assuming, now, that the slide is at the forward end of its stroke, as in Fig. 4, when the driving motor M is started the slide moves rearwardly thus carrying the pasting and label carrying arms longitudinally away from the tracks. As the rearward movement of the slide continues, the movable part 106'' of the rack is brought into contact with the stationary part 106', after which, through the operation of the toothed segment, the carrier arms are swung through an arc of 180° thus directing them toward the rear of the machine, the rotative movement of the arms being arrested substantially as the lug 120 engages the tongue 109 on the movable member 106''', following which the arms are moved longitudinally to come to rest in positions to respectively receive the paste and the label. The pasting roller 125 which has meanwhile been maintained in contact with the paste pan roll 151 to receive a coating of paste therefrom, is now caused to rapidly descend through the coaction of cam 59 and the paste roll fork 130, and pass over the paste pad 96 to deposit a coating of paste thereon, after which the fork is raised by the action of the spring pressed plunger 136 to again bring the paste roll into contact with the paste pan roll.

Moreover, during the movement of the label carrier arm to label receiving position, the valve plunger 272 is operated by the plunger stop 281 in such manner as to open communication between the ports 100 in the pad 99 and the pump, thus creating a suction in the ports sufficient to draw the foremost label in the label magazine past the stop pins 181 and cause its adherence to the pad, this operation occurring substantially simultaneously with the application of the paste to the pad 96. The pads having now been respectively supplied with paste and with a label are in condition to be moved to the stations where the paste and label are applied.

The rear stroke of the slide is also effective through the link 226 to raise the waxing brush from the wax pan to a substantially horizontal position in alignment with the waxing station, the coaction of the pawl 230 with the ratchet wheel 222 operating during this movement to impart to the brush shaft a slight axial rotation as already described.

It will be apparent, furthermore, that during the rearward movement of the slide 75, the cam slide 332 is actuated to cause the lid magazine to release the bottom lid in the stack which, as it falls, is guided by the inclined bottom of the trough into the groove 10 in the tracks, down which it travels until brought to rest by the pin 15 at the initial or #1 station.

For convenience of description I shall now first trace the progress of this one-lid through the machine and refer in sequence to its several movements and the manner in which the pasting, labeling and waxing operations are performed upon it. It will, however, of course be understood, and as more fully explained hereinafter, that in the normal operation of the machine a plurality of lids are at all times passing therethrough in properly timed sequence to be subjected to the several operations intended to be performed at the different stations during a single complete cycle of the machine as measured by a single complete revolution of the upper cam shaft, so that in each such cycle the pasting, labeling and waxing operations are normally respectively performed upon three different lids.

Considering for the moment, however, only the first lid which has been dropped from the magazine as aforesaid, during the early part of the ensuing forward movement of the slide, the pin 15 is retracted through the operation of cam 19′ to permit this lid to drop to the pasting station where it comes to rest supported on pin 16, and as the paste carrier arm approaches the termination of its forward movement, the slide 75 engages the trip lever push rod 250 thus forcing the pad 235 against the under side of the lid to press the latter against the resilient pasting pad and effect transference of the paste P to the lid.

After the pasting operation, the slide again moves to the rear, the lid remaining supported at the pasting station until about the time the slide reaches the end of its rear stroke when, through the operation of cam 20′, pin 16 is retracted to permit the pasted lid to pass to the labeling station at which it is supported on the pin 17. Toward the end of the ensuing forward stroke of the slide, the label carrier arm pad 99 is brought adjacent the pasted lid and the lower contact pad 235 moved rearwardly by engagement of the slide with the adjacent trip lever push rod 250 so as to press the pasted lid firmly against the label T carried by the pad, and as the suction in the ports 100 has been relieved through contact of the valve plunger with the stop 281 substantially as the slide has come to rest, the label is free to adhere to the pasted surface of the lid when the pad 99 is moved away therefrom by the ensuing rearward stroke of the slide.

Preferably quite promptly after the application of the label to the lid and while the slide is again moving rearwardly, the pin 17 is retracted to permit the labeled lid to fall to the waxing station at which it is supported by pin 18 in position to receive the wax from the waxing brush which is then approaching its horizontal position. Substantially as the slide reaches the end of its rearward stroke the push rod 233 is sharply projected forward by cam 233′ to oscillate lever 231 and move the brush carrying the fluid wax against the under surface of the lid at the waxing station, to apply a thin coating W of the wax or other material thereto so as to cover the perforations and partially impregnate the label locally thereto, the contact pad 260 having meanwhile been forced toward the front of the machine, through the action of cam 265′ and push rod 265, to support the lid during the waxing operation. On the ensuing forward stroke of the slide and preferably about as it reaches central position, pin 18 is retracted to permit the waxed lid to slide downwardly in the tracks and pass onto the conveyor belt B, the blast of air from the blower serving to cool the lid and its coating as it leaves the tracks and thus place it in a condition to be removed by the conveyor to the stacking mechanism or any other desired point.

In thus tracing the progress of a single lid through the machine no reference has purposely been made to the coordinated sequence of operations which, in the normal employment of the machine, are progressively performed by it upon a plurality of lids simultaneously supported at different points along the track and a brief reference will now be made thereto, proceeding on the assumption that the parts are initially in the position shown in Fig. 4 in which one lid has just been pasted at the pasting station and another lid just been labeled at the labeling station.

It will be noted that under these conditions the pin 15 is preferably retracted and the pin 18 projected and that no lids are present at either the initial or the waxing stations. Now as the slide moves rearwardly from the position shown in said figure, the labeled lid is quickly dropped by retraction of pin 17 from the labeling station to the waxing station so as to receive the wax from the waxing brush as the latter is brought against it. During this movement of the slide, the pin 15 is re-projected and after the slide has moved about two-thirds of its stroke to the rear a fresh lid is dropped from the magazine and supported by pin 15 at the initial station. Following the commencement of the ensuing forward stroke of the slide, pin 16 is retracted and the previously pasted lid allowed to fall from the pasting station to the labeling station, pin 17 having been meanwhile re-projected into the path of that lid so as to afford support thereto. Promptly after this operation, pin 16 is again re-projected and pin 15 retracted to allow the fresh lid to fall from the initial to the pasting station prior to the arrival of the paste carrier arm adjacent thereto, the pin 18 having meanwhile, during the same forward movement of the slide, been withdrawn from beneath the waxed lid at waxing station to permit the waxed lid to pass on to the conveyor.

It will thus be apparent that the various elements of the machine are so timed that the lids arrive consecutively at the several stations at proper intervals to permit the pasting, labeling and waxing operations to be respectively performed on three separate lids in a single complete cycle of the machine, thereby securing maximum rapidity of production, and as the machine is capable of being operated at relatively high speeds and with a minimum of attention, a very great saving both in time and cost of labor can be effected by its employment for labeling and waxing a given number of lids over that required when these operations are performed manually as heretofore.

While I have herein described and illustrated with considerable particularity a preferred embodiment of my invention adapted for labeling and waxing circular can lids of the general character to which reference has hitherto been made, I do not thereby desire or intend to limit myself to the employment of the invention solely for that purpose, as the invention may be readily adapted for the performance of analogous operations on articles other than can lids and such adaptation and employment is entirely within the scope and contemplation of the invention; nor do I desire or intend to confine myself in any manner to any precise arrangement or parts or specific forms of means for accomplishing the objects and functions of the invention, as any suitable means other than those to which I have referred may be utilized for the accomplishment thereof without departing from the spirit and scope of the invention as defined in the appended claims.

Having thus described my invention, I claim and desire to protect by Letters Patent of the United States:

1. A machine for labeling and waxing lids comprising means for guiding the lids, means for supplying paste, means for holding the labels, means for carrying paste from the paste supplying means to the lids, means for carrying the labels from the label holding means to the lids, and means for supplying a coating of wax or the like to the lids.

2. A machine as specified in claim 1 in which during a single cycle of operations paste and a label are simultaneously applied to two lids supported in spaced relation in the guiding means and a coating is applied to a third previously labeled lid also supported therein.

3. A machine as specified in claim 1 and embodying means for supporting a lid at a plurality of separate stations in its passage along the guiding means in positions to be consecutively acted upon by said paste transferring means, said label transferring means and said coating means.

4. A machine as specified in claim 1 and comprising means for warming the guiding means in the vicinity of the coating means.

5. A machine as specified in claim 1 and comprising means for pressing the lid respectively against said paste transferring means, said label transferring means and said coating means during its passage along said guiding means.

6. A machine of the class described, comprising a vertically extending lid guiding track adjacent one end, paste supplying means and label holding means adjacent the other end, means for transferring paste from the paste supplying means to a point adjacent one side of the tracks, means for transferring a label from the label holding means to another point adjacent the same side of the tracks, wax holding means, and means for transferring wax from said holding means to a point adjacent the opposite side of said tracks.

7. A machine as specified in claim 6 and comprising means for supporting a lid at different stations along said tracks in substantial alignment with said paste transferring, said label transferring and said wax transferring means.

8. A machine as specified in claim 6 and comprising means operative to support a lid in said tracks at a station to receive paste from said paste transferring means, means operative to support the lid in said tracks at a station to receive a label from said label transferring means, means operative to support the lid in said tracks at a station to receive wax from said wax transferring means, and means for actuating said several supporting means in such manner as to permit the lid to pass from one station to another in properly timed relation with said several transferring means.

9. A machine of the class described comprising vertically extending tracks adapted to guide a lid, paste supplying and label holding means removed from the tracks and arranged on one side thereof and wax applying means arranged on the other side, paste transferring means, label transferring means and wax transferring means respectively operative to transfer paste, a label and wax from said paste supplying, label holding and wax applying means to points adjacent said tracks, and means for pressing a lid against said transferring means progressively as it passes along said tracks.

10. A machine as specified in claim 9 and comprising means for warming the track adjacent the station where the lid is pressed against the wax transferring means.

11. A machine as specified in claim 9 in which said paste transferring means and said label transferring means are actuated to simultaneously transfer paste and a label to different lids and said wax transferring means are actuated to transfer wax to a third lid in a single cycle of operations of the machine.

12. A machine of the class described comprising a magazine adapted to contain a stack of lids to be operated upon, means for operating the magazine to consecutively release said lids, guiding means for receiving the lids extending downward from below the magazine, means for temporarily supporting a lid at a plurality of different stations as it traverses said guiding means, means for applying paste to one side of the lid at the first station, means for applying a label to the same side of the lid at the second station, and means for applying a coating to the opposite side of the lid at the third station.

13. A machine as specified in claim 12 and comprising means adjacent each station for respectively pressing the lid against the paste applying means, the label applying means and the coating applying means after the lid progressively reaches the several stations.

14. A machine as specified in claim 12 and embodying means for retarding progress of the lid in its progress along said guiding means.

15. A machine as specified in claim 12 and embodying means for frictionally engaging the lid in its progress along said guiding means and operative to prevent rebound of the lid as it strikes said supporting means.

16. A machine as specified in claim 12 and embodying a brush disposed adjacent said guiding means and adapted to engage the lid as it approaches the supporting means to retard the progress of the lid and prevent its rebound from said supporting means.

17. A machine as specified in claim 12 and having means interposed between the magazine and the guiding means operative to direct the lids into the guiding means in a substantially vertical position.

18. A machine as specified in claim 12 and having a trough provided with an inclined bottom interposed between the magazine and the guiding means and operative to turn the lids after their release from the magazine from a horizontal to a substantially vertical position to facilitate their entry into the guiding means.

19. A machine of the class described comprising means adapted to consecutively feed the lids to be operated on, guiding means for receiving the lids from said feeding means, means for consecutively applying paste, a label and a coating of substantially fluid material to each lid as it passes along said guiding means, and means for warming the lid and the coating material prior to its application to the lid.

20. The combination with a machine as specified in claim 19, of means for cooling the lid and the coating after its application thereto.

21. The combination with a machine as specified in claim 19, of means for directing a blast of air on the lid after the application of the coating thereto.

22. The combination with a machine as specified in claim 19, of a blower operative to direct a current of air on the lid substantially as it leaves the guiding means.

23. The combination with a machine as specified in claim 19, of means for transferring the coated lids to a point remote from the guiding means.

24. The combination with a machine as specified in claim 19, of a belt conveyor operative to transfer the coated lids from the guiding means to a point remote therefrom and means for actuating the conveyor.

25. A label magazine for labeling and waxing machine comprising a fixed housing having a bore, a label holder adapted to contain a stack of labels, a plurality of fixed radially disposed pins extending inwardly beyond the line of said bore and operative to removably retain the labels in the holder and the bore, and means for removably supporting the holder on the housing in position to align the stack of labels with said bore.

26. A label magazine for a labeling and waxing machine comprising a fixed housing having an opening, a label holder adapted to contain a stack of labels and provided with a plurality of apertures adjacent its ends adapted for the reception of removable means operative when in position in said apertures to confine a stack of labels within the holder, and means for removably supporting the holder on the housing in position to align the stack with the opening in the housing.

27. In a machine for labeling and waxing lids the combination of lid guiding means, means for consecutively feeding the lids to the guiding means, paste supplying means, label holding means, means for transferring paste from said paste supplying means to a point adjacent said guiding means, means for transferring a label from said label holding means to another point adjacent said guiding means, means for creating a suction in said label transferring means when adjacent said label holding means to cause the adherence of a label to said transferring means, and means for releasing the suction when the transferring means is adjacent the guiding means.

28. A machine for labeling and waxing lids embodying lid guiding means adapted to receive and guide the lid to be operated on, paste supplying means, label holding means and means for respectively transferring paste and a label therefrom to points adjacent said guiding means, said transferring means comprising a reciprocatory slide, a shaft journaled in the slide, a paste carrier arm and a label carrier arm movable with the shaft, means for reciprocating the slide, and means for imparting rotative movement to the shaft during the reciprocation of the slide.

29. A machine as set forth in claim 28 and in which the means for imparting rotative movement to the shaft during the reciprocation of the slide comprise a rack having a stationary and relatively movable parts and a toothed segment carried by the shaft and cooperative with the rack.

30. A machine as set forth in claim 28 and in which the means for imparting rotative movement to the shaft during the reciprocation of the slide comprise a rack having a stationary and relatively movable members, a gear carried by the shaft and cooperative therewith, and means for limiting the arc through which the shaft can be rotated by cooperation of the gear and the rack.

31. In a machine for labeling and waxing lids, a slide adapted for movement of translation, a shaft journaled in said slide, a gear rotatable with the shaft, a rack cooperative with the gear and having a fixed part and a movable part, and means for engaging and translating said movable part when the slide approaches the end of its movement and when said gear is engaged therewith, whereby during the movement of said slide the gear is revolved by cooperation with the rack when said means are out of engagement with the movable part thereof and said movable part is translated in relatively fixed position with respect to the gear when said means are in engagement with said movable part.

32. In a machine for labeling and waxing lids, a shaft and means operative to impart thereto a simultaneous movement of rotation and translation and a subsequent movement of translation alone, said means comprising a slide adapted for rectilinear movement and in which the shaft is journaled for axial rotation, a gear mounted on the shaft, a rack cooperative with the gear and having a fixed part and a relatively movable part, means adapted to engage said movable part during a portion of the movement of the slide to move said part relatively to the fixed part, and means for maintaining the movable part in engagement with the fixed part during another portion of the movement of the slide, whereby during said last mentioned portion of said movement the gear is rotated by cooperation with the rack to turn the shaft and during the first mentioned portion of said movement the movable part of the rack is moved with respect to the fixed part by engagement with said means whereby said gear and said movable part remain in relatively stationary position.

33. In a machine for labeling and waxing lids, a shaft and means to impart thereto an initial movement of translation, then a combined movement of axial rotation and of translation and a final movement of translation, said means comprising a reciprocating slide in which the shaft is journaled for axial rotation, a gear mounted on the shaft, a rack cooperative therewith and having a central fixed part and relatively movable end parts, means for normally yieldingly maintaining the end parts in engagement with the fixed part, and means for engaging the adjacent end part as the slide approaches either end of its stroke so as to move said end part away from the fixed part, whereby when the gear is in engagement with either end part and the latter is in engagement with said means said end part and said gear move as a fixed unit with the slide and without axial rotation of the shaft, but when the adjacent end part is out of engagement with said means rotation of said gear by cooperation with said movable or said fixed part is effected simultaneously with the movement of said slide.

34. In a machine for labeling and waxing lids, a movable slide, a shaft journaled in the slide for axial rotation, a gear carried by the shaft, a rack arranged for meshing engagement with the gear and having a fixed part and a relatively movable part, means for normally maintaining the relatively movable part in engagement with the fixed part, and means operative to move the movable part away from the fixed part after the gear has engaged the movable part during the movement of the slide.

35. In a machine for labeling and waxing lids, a reciprocating slide, a shaft journaled in the slide, a gear carried by the shaft, a toothed rack disposed for meshing engagement with the gear and having a fixed central part and relatively movable end parts, means for yieldingly normally maintaining the end parts in engagement with the fixed part, means for engaging and moving the adjacent movable part of the rack away from the fixed part when the slide approaches the end of its stroke in either direction, and means operative to guide the shaft when the slide is adjacent either end of its path.

36. In a machine for labeling and waxing lids, a slide movable in a rectilinear path, a shaft journaled in the slide and carrying a gear, a rack disposed for meshing engagement with the gear and having a fixed part and a movable part, means for yieldingly normally maintaining the movable part in engagement with the fixed part, means movable with the slide for engaging the movable part and moving it away from the fixed part as the slide approaches the end of its stroke, a dog movable with the shaft, and means for receiving said dog toward the termination of the movement of the slide to lock said shaft against axial rotation during the final movement of the slide.

37. In a machine for labeling and waxing lids, a reciprocating member, means for moving the member, a shaft journaled in the member and having a gear, a rack having a stationary central part and relatively movable end parts, all of said parts provided with teeth adapted for meshing engagement with said gear, means for yieldingly normally maintaining said end parts in engagement with the central part of the rack, and means carried by the reciprocating member operative to engage one or the other of said end parts as the member approaches the limit of its movement in either direction so as to separate such end part from the central part of the rack, said end part being then in engagement with said gear.

38. In a machine for labeling and waxing lids, a shaft, means adapted to impart to the shaft simultaneous movements of translation and rotation and a subsequent movement of translation, said means comprising a movable member in which said shaft is journaled, means for moving the member, a gear carried by the shaft, a toothed rack having a fixed part and a movable part, means for normally yieldingly holding said parts so as to provide a continuous toothed surface for cooperation with said gear, and means for separating said parts as the member approaches the end of its movement and after the teeth of said gear have come into engagement with the teeth on said movable part.

39. In a machine for labeling and waxing lids, a shaft, and means adapted to impart a simultaneous movement of rotation and linear translation to the shaft and a subsequent movement of linear translation thereto and comprising a movable member in which said shaft is journaled, means for moving the member, a gear carried by the shaft, a toothed rack having relatively separable parts one of said parts being fixed, means for normally yieldingly maintaining said parts in a position to present a continuous toothed surface for cooperation with the gear, means for separating said movable part from the fixed part during a portion of the movement of said member and after said gear has engaged the teeth on said movable part, and means operative to prevent axial rotation of the shaft as the member approaches the end of its movement.

40. The method of applying a label to one face of an article and a coating to the opposite face thereof which comprises imparting movement to the article along a predetermined path, arresting the progress of the article at one station and applying the label thereto, and arresting the progress of the article at another station and applying the coating thereto while maintaining the same relative position of the article.

41. The method of applying a label to one face of an article and a coating to another face thereof which comprises imparting to the article an intermittent movement between stations disposed along predetermined path and progressively applying at different stations paste and the label to one face and the coating to the other face as the article is supported at different stations in the same relative position.

42. The method of labeling and coating an article which comprises effecting a movement of translation of the article along a predetermined path and progressively applying paste and a label to one face of the article and a coating to the opposite face thereof while maintaining the article in the same relative position during its progress along said path.

43. The method of labeling and coating an article which comprises effecting movement of the article from one station to another disposed in a predetermined path, arresting the movement of the article at each station and consecutively applying paste and a label to one face and a coating to the opposite face of the article while the article is maintained at the different stations in the same relative position.

44. The method of labeling and coating an article which comprises effecting progressive movement of the article through a plurality of spaced stations and consecutively applying at the respective stations paste and a label to one face of the article and a coating to the opposite face while maintaining the article in the same relative position.

45. The method of labeling and coating an article which comprises effecting progressive movement of the article through a plurality of spaced stations and applying paste to the article at one station, a label to the pasted surface thereof at another station and a fluid coating to the opposite face of the article at a third station.

46. The method of labeling and coating an article which comprises effecting progressive movement of the article through a plurality of spaced stations and applying paste to the article at one station, a label at a second station, warming the article substantially as it reaches a third station and applying a coating to said article at said station thereafter.

47. The method of labeling and coating an article which comprises effecting progressive movement of the article through a plurality of spaced stations and applying paste to the article at one station, a label to the pasted surface at a second station, a coating of heated material at a third station and then cooling the article and the coating.

In witness whereof, I have hereunto set my hand this 27th day of December, 1922.

MARTIN E. BRIGHAM.